United States Patent
Wang et al.

(10) Patent No.: US 10,219,278 B2
(45) Date of Patent: Feb. 26, 2019

(54) DATA TRANSMISSION METHOD AND RELATED DEVICE

(71) Applicant: Huawei Technologies Co., Ltd., Shenzhen (CN)

(72) Inventors: Lei Wang, Shanghai (CN); Shunqing Zhang, Shenzhen (CN); Yan Chen, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 29 days.

(21) Appl. No.: 15/474,200

(22) Filed: Mar. 30, 2017

(65) Prior Publication Data

US 2017/0208596 A1    Jul. 20, 2017

Related U.S. Application Data

(63) Continuation of application No. PCT/CN2014/088032, filed on Sep. 30, 2014.

(51) Int. Cl.
*H04B 7/12* (2006.01)
*H04W 72/04* (2009.01)
(Continued)

(52) U.S. Cl.
CPC .......... *H04W 72/0466* (2013.01); *H04B 7/12* (2013.01); *H04L 1/04* (2013.01);
(Continued)

(58) Field of Classification Search
None
See application file for complete search history.

(56) References Cited

U.S. PATENT DOCUMENTS 8,638,761 B2 *  1/2014  Taghavi Nasrabadi ......................
                                                    H04L 1/0606
                                                        370/335
2007/0140100 A1 *  6/2007  Ouyang .............. H03M 13/271
                                                        370/203
(Continued)

FOREIGN PATENT DOCUMENTS

CN           1556624 A      12/2004
CN         101018224 A       8/2007
(Continued)

OTHER PUBLICATIONS

Hoshyar, R. et al.,"LDS-OFDM an Efficient Multiple Access Technique," 2010 IEEE 71st Vehicular Technology Conference, Jan. 1, 2010, 5 pages.
(Continued)

*Primary Examiner* — Brian S Roberts
(74) *Attorney, Agent, or Firm* — Slater Matsil, LLP

(57) ABSTRACT

A data transmission method and a related device are disclosed. The data transmission method includes: obtaining to-be-transmitted K bits; mapping the K bits to F resource units according to a codebook and a value of the K bits, so as to obtain a codeword $C_K$ that is to be transmitted by using the F resource units, where the codebook includes S codewords in a one-to-one mapping relationship with S different values of the K bits; and sending the codeword $C_K$ by using the F resource units.

24 Claims, 8 Drawing Sheets

(51) Int. Cl.
*H04W 16/02* (2009.01)
*H04L 1/04* (2006.01)
*H04L 5/00* (2006.01)
*H04L 27/34* (2006.01)
*H04L 1/00* (2006.01)

(52) U.S. Cl.
CPC .......... *H04L 5/0016* (2013.01); *H04L 5/0021* (2013.01); *H04L 5/0044* (2013.01); *H04L 27/3488* (2013.01); *H04W 16/02* (2013.01); *H04L 1/0041* (2013.01)

(56) References Cited

U.S. PATENT DOCUMENTS

| | | | |
|---|---|---|---|
| 2009/0074103 A1* | 3/2009 | Varadarajan | H04L 1/0041 375/295 |
| 2011/0250887 A1* | 10/2011 | Tenny | H04W 56/00 455/436 |

FOREIGN PATENT DOCUMENTS

| | | |
|---|---|---|
| CN | 101018269 A | 8/2007 |
| CN | 102065046 A | 5/2011 |
| WO | 2004098091 A1 | 11/2004 |
| WO | 2014075637 A1 | 5/2014 |

OTHER PUBLICATIONS

Nikopour, H., et al., "Sparse Code Multiple Access," 2013 IEEE 24th International Symposium on Personal, Indoor and Mobile Radio Communications: Fundamentals and PHY Track, pp. 332-336.

Van De Beek, J., et al., "Multiple Access with Low-Density Signatures," 2009 IEEE Global Telecommunications Conference (GLOBECOM), Nov. 30-Dec. 4, 2009, 6 pages.

Gao, W. et al., "Subcarrier Spreading for ICI Mitigation in OFDM/OFDMA Systems," IEEE 2010 International Conference on Communications (ICC), May 23-37, 2010, 6 pages.

Ryu, H.-S. et al., "BER Analysis of Dual-Carrier Modulation (DCM) over Rayleigh Fading Channel," 2010 International Congress on Ultra Modern Telecommunications and Control Systems and Workshops (ICUMT), Oct. 18-20, 2010, 5 pages.

* cited by examiner

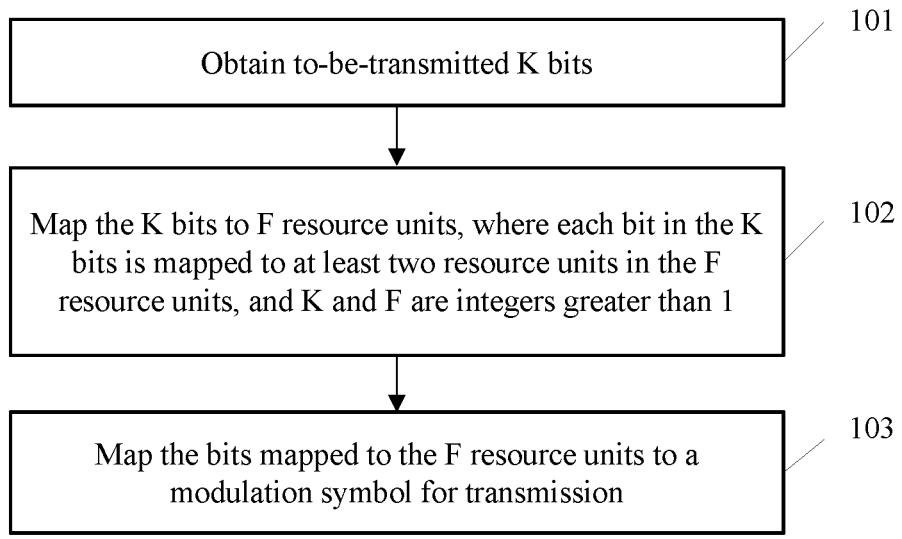
FIG. 1
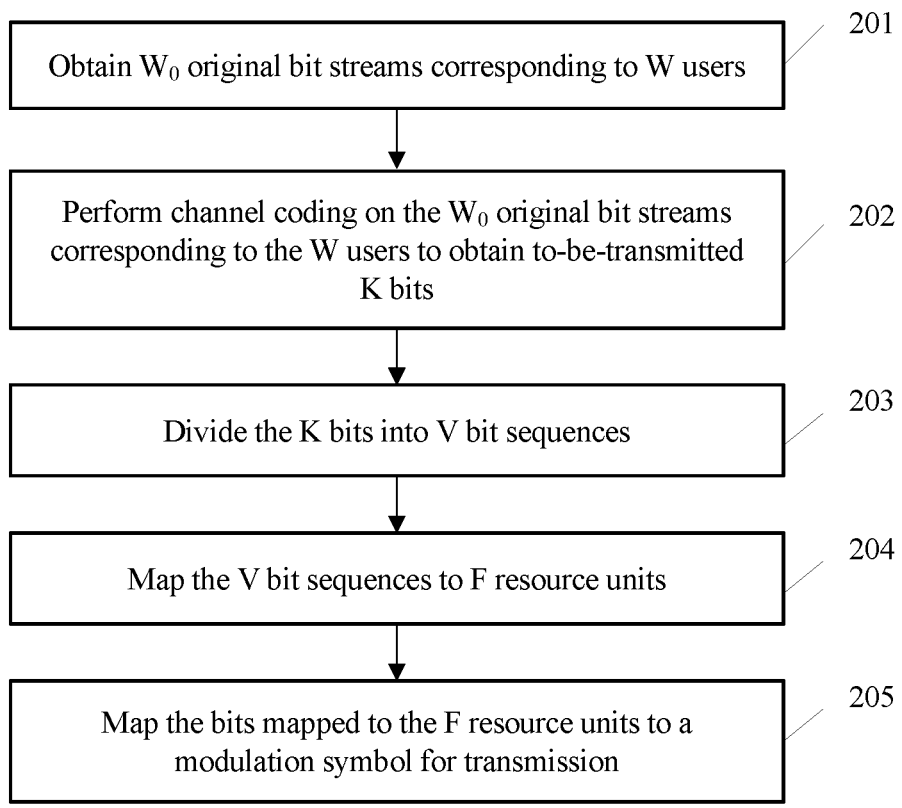
FIG. 2-a

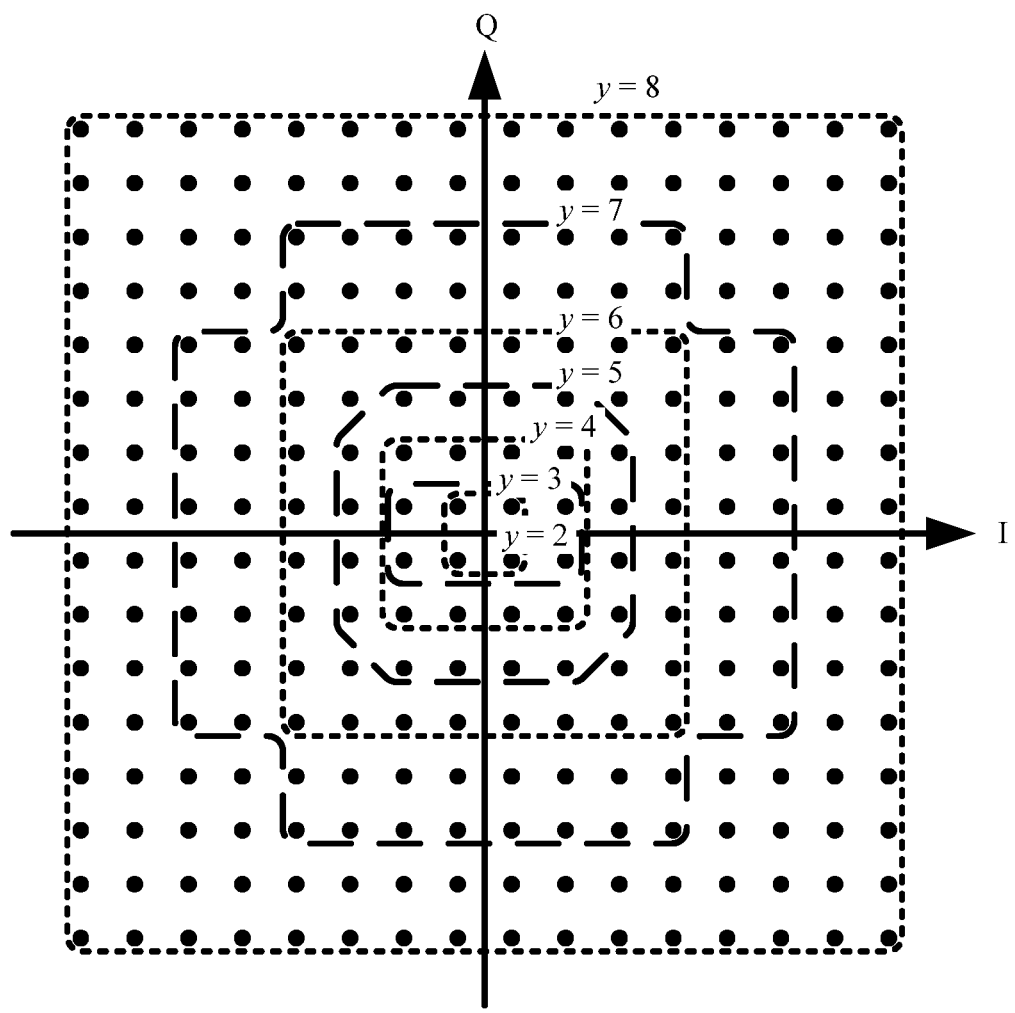
FIG. 2-b

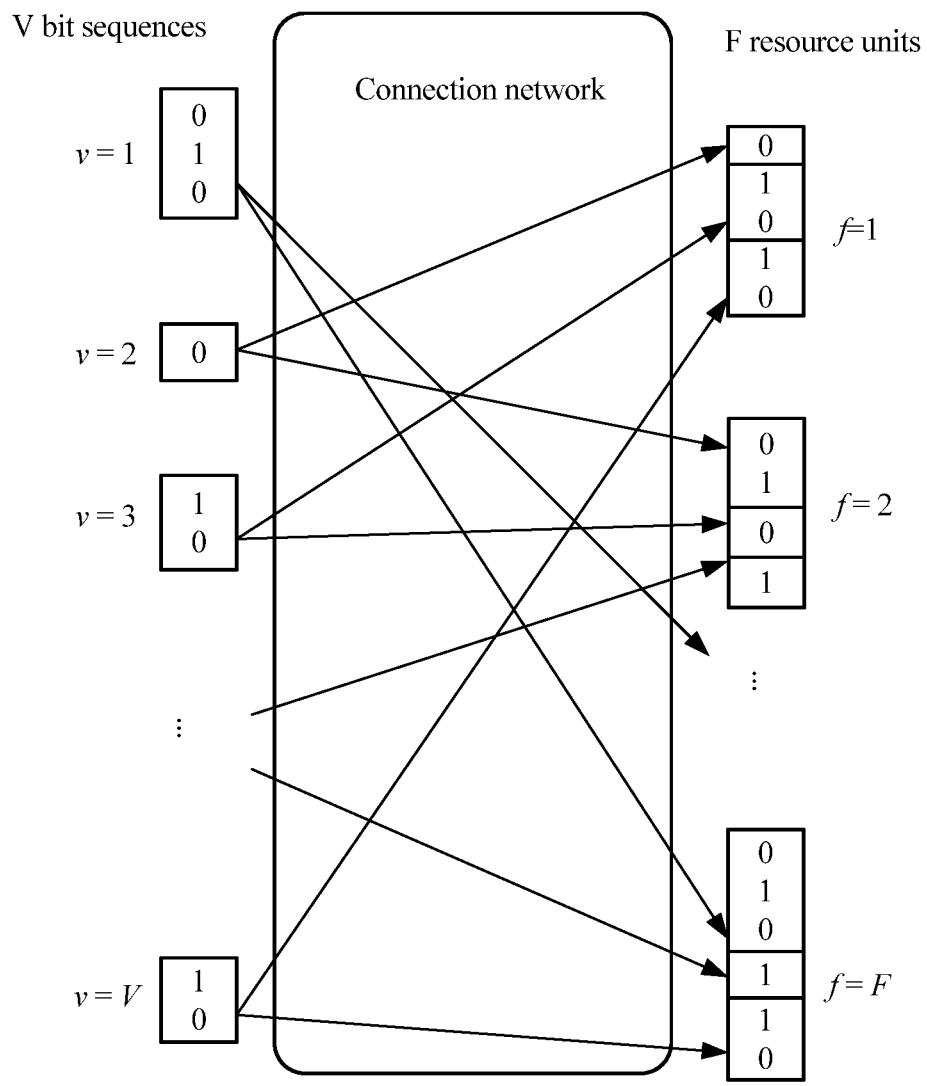
FIG. 2-c

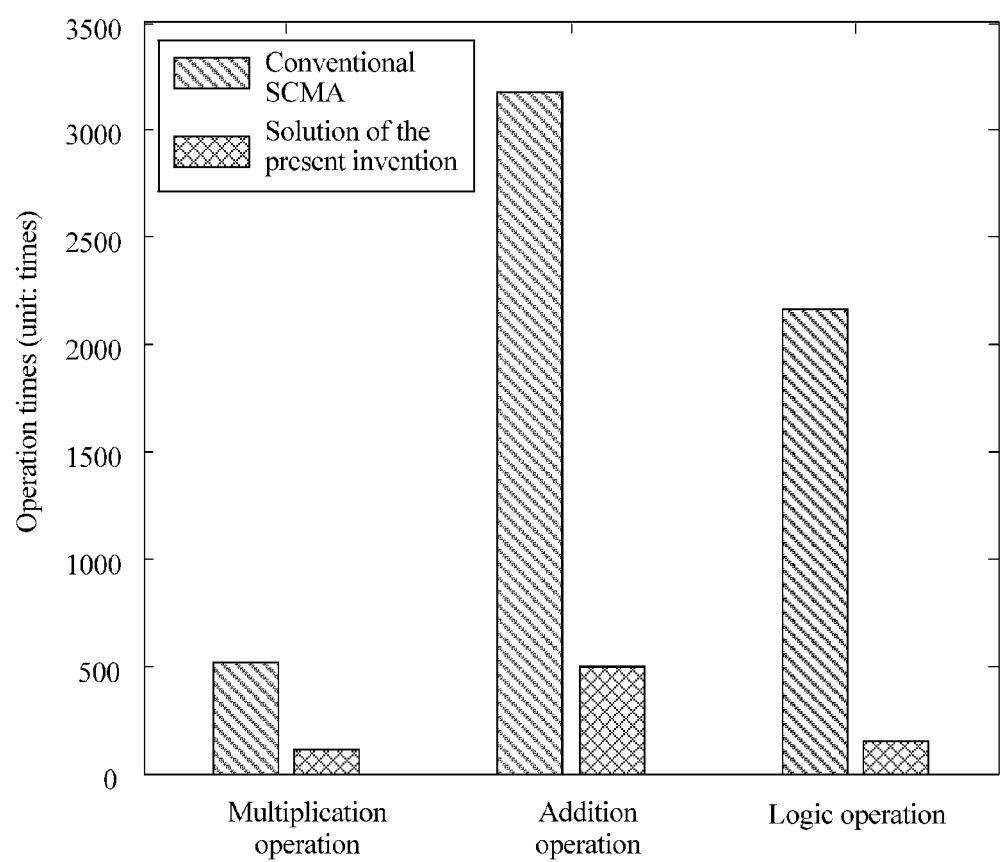
FIG. 2-d

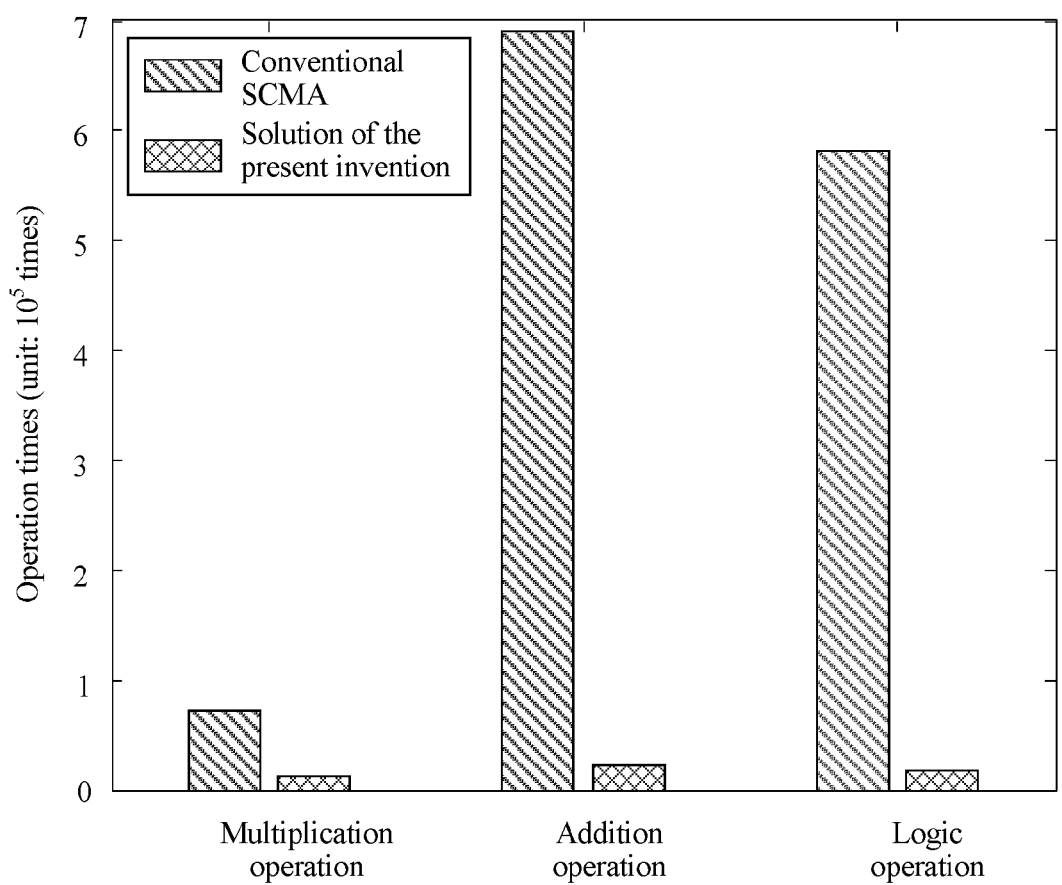
FIG. 2-e

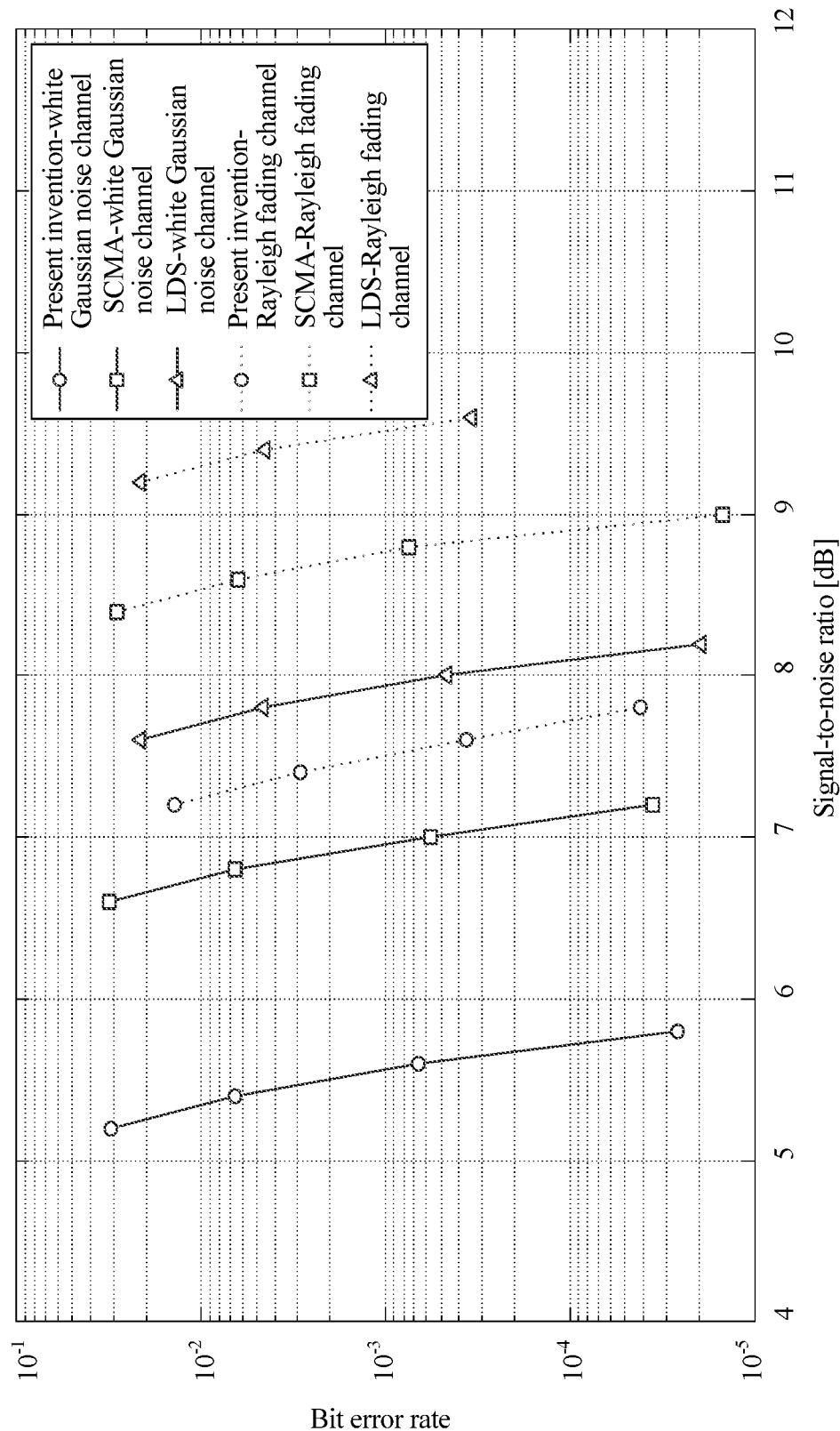
FIG. 2-f

DATA TRANSMISSION METHOD AND RELATED DEVICE

CROSS-REFERENCE TO RELATED APPLICATIONS

This application is a continuation of International Patent Application No. PCT/CN2014/088032, filed on Sep. 30, 2014, the disclosure of which is hereby incorporated by reference in its entirety.

TECHNICAL FIELD

The present invention relates to the field of communications technologies, and in particular, to a data transmission method and a related device.

BACKGROUND

Modulation plays an important role in a communications system in converting original data (bits) to an air interface signal that is appropriate for transmission, and is an important part in effective working of the communications system. A modulation mode with a fixed quantity of bits or the like is used for standardization of transmission in a conventional communications system. However, for an existing Long Term Evolution system or the like, a combination of coding and modulation is usually used to implement continuous rate adjustment. For example, different orders of a modulation and coding scheme are defined.

For a future 5th Generation (5G) communications system, application space of a conventional modulation and coding scheme is to be increasingly limited, which is mainly reflected in: With further development of a multimedia application, a dynamic compression ratio of information bits is to become increasingly high. In this background, source coding and channel coding need to be comprehensively considered to effectively reduce channel fading. However, the conventional modulation and coding scheme generally depends on coding with a fixed rate (that is, a mother code rate), effective joint source and channel coding cannot be implemented. Further development of a coding mode (such as a fountain code) with no fixed rate requires a more flexible modulation mode, which can satisfy a modulation demand for any rate. Wide application of a new communications mode such as machine type communications or in-vehicle communications imposes a new requirement on a modulation rate range, modulation reliability, and the like.

A conventional signal modulation mechanism is relatively poor in an aspect such as transmission reliability. Therefore, driven by the current new requirement, researching some signal modulation mechanisms better in transmission reliability and other aspects has great technical significance.

SUMMARY

Embodiments of the present invention provide a data transmission method and a related device, so as to improve bit transmission reliability.

A first aspect of the present invention provides a data transmission method. The method includes obtaining to-be-transmitted K bits. The method also includes mapping the K bits to F resource units according to a codebook and a value of the K bits, so as to obtain a codeword $C_K$ that is to be transmitted by using the F resource units, where the codebook includes S codewords in a one-to-one mapping relationship with S different values of the K bits, S is less than or equal to $2^K$, each codeword in the S codewords is a complex number vector that includes F complex numbers, a difference between the $i^{th}$ value and the $j^{th}$ value of the K bits is that a value of only one bit is different, a codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$ and a complex number $Z_{j2}$ that are included in the codeword $C_j$, K, F, and S are integers greater than 1, i is not equal to j, and i and j are positive integers less than or equal to S. The method also includes sending the codeword $C_K$ by using the F resource units.

With reference to the first aspect, in a first possible implementation manner of the first aspect, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords.

With reference to the first aspect, in a second possible implementation manner of the first aspect, a value of a complex number $Z_{u1}$ at a position $\alpha$ in a codeword $C_u$ is different from that of a complex number $Z_{e1}$ at a position $\alpha$ in a codeword $C_e$, a value of a complex number $Z_{u2}$ at a position $\beta$ in the codeword $C_u$ is different from that of a complex number $Z_{e2}$ at a position $\beta$ in the codeword $C_e$, the codeword $C_u$ and the codeword $C_e$ are any two codewords in S2 codewords, and the S2 codewords are a part or all of the S codewords.

With reference to the first aspect, the first possible implementation manner of the first aspect, or the second possible implementation manner of the first aspect, in a third possible implementation manner of the first aspect, the obtaining to-be-transmitted K bits includes: when a modulation order corresponding to the codebook is M, obtaining $\log_2(M)$ bits from each layer of data stream in W layers of data streams to form the K bits, where W and M are integers greater than 1.

With reference to the first aspect, the first possible implementation manner of the first aspect, the second possible implementation manner of the first aspect, or the third possible implementation manner of the first aspect, in a fourth possible implementation manner of the first aspect, the codebook includes a part or all of codewords in a codebook 1 in the embodiments of the present invention when K is equal to 6.

With reference to the first aspect, the first possible implementation manner of the first aspect, the second possible implementation manner of the first aspect, or the third possible implementation manner of the first aspect, in a fifth possible implementation manner of the first aspect, the codebook includes a part or all of codewords in a codebook 2 in the embodiments of the present invention when K is equal to 12.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the data transmission method is executed by a user terminal or a base station.

A second aspect of the present invention provides a data transmission method. The method includes obtaining to-be-transmitted K bits. The method also includes mapping the K bits to F resource units, where each bit in the K bits is mapped to at least two resource units in the F resource units, and K and F are integers greater than 1. The method also includes mapping the bits mapped to the F resource units to a modulation symbol for transmission.

With reference to the second aspect, in a first possible implementation manner of the second aspect, the mapping the K bits to F resource units includes: dividing the K bits into V bit sequences; and mapping the V bit sequences to the F resource units, where each bit sequence in the V bit sequences is mapped to at least two resource units in the F resource units, and V is an integer that is greater than 1 and less than or equal to K.

With reference to the first possible implementation manner of the second aspect, in a second possible implementation manner of the second aspect, the V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units.

With reference to the second possible implementation manner of the second aspect, in a third possible implementation manner of the second aspect, a resource unit group i in the V resource unit groups includes a resource unit $i_1$ and a resource unit $i_2$, and a resource unit group j in the V resource unit groups includes a resource unit $j_1$ and the resource unit $i_2$.

With reference to the second aspect, the first possible implementation manner of the second aspect, the second possible implementation manner of the second aspect, or the third possible implementation manner of the second aspect, in a fourth possible implementation manner of the second aspect, the mapping the bits mapped to the F resource units to a modulation symbol for transmission includes: mapping, based on a constellation diagram, the bits mapped to the F resource units to the modulation symbol for transmission, where a constellation diagram used for mapping y bits mapped to a resource unit j in the F resource units to the modulation symbol for transmission is a constellation diagram x; if y is an even number, the constellation diagram x is a square Gray constellation that includes $2^y$ constellation points, and/or if y is an odd number, the constellation diagram x is a cross Gray constellation that includes $2^y$ constellation points.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, a bit a in the K bits is mapped to f1 resource units in the F resource units, and a bit b in the K bits is mapped to f2 resource units in the F resource units, where the bit a mapped to the f1 resource units is separately mapped to f1 bit carry positions on the modulation symbol, and the bit b mapped to the f2 resource units is separately mapped to f2 bit carry positions on the modulation symbol; a sum of transmission reliability indicator values corresponding to the f1 bit carry positions is $f1^+$, and a sum of transmission reliability indicator values corresponding to the f2 bit carry positions is $f2^+$, where an absolute value of a difference between $f1^+$ and $f2^+$ is less than or equal to a third threshold; and the bit a and the bit b are any two bits in the K bits; a larger transmission reliability indicator value indicates higher transmission reliability of a corresponding bit carry position, or a smaller transmission reliability indicator value indicates higher transmission reliability of a corresponding bit carry position.

With reference to the second aspect, the first possible implementation manner of the second aspect, the second possible implementation manner of the second aspect, the third possible implementation manner of the second aspect, or the fourth possible implementation manner of the second aspect, in a sixth possible implementation manner of the second aspect, a bit c in the K bits is mapped to f3 resource units in the F resource units, and a bit d in the K bits is mapped to f4 resource units in the F resource units, where the bit c mapped to the f3 resource units is separately mapped to f3 bit carry positions on the modulation symbol, and the bit d mapped to the f4 resource units is separately mapped to f4 bit carry positions on the modulation symbol; a sum of transmission reliability indicator values corresponding to the f3 bit carry positions is $f3^+$, and a sum of transmission reliability indicator values corresponding to the f4 bit carry positions is $f4^+$; the bit c and the bit d are any two bits in the K bits; and if importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

With reference to the sixth possible implementation manner of the second aspect, in a seventh possible implementation manner of the second aspect, the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

A third aspect of the present invention provides a data transmission apparatus. The apparatus includes an obtaining unit, configured to obtain to-be-transmitted K bits. The apparatus also includes a mapping unit, configured to map the K bits to F resource units according to a codebook and a value of the K bits, so as to obtain a codeword $C_K$ that is to be transmitted by using the F resource units, where the codebook includes S codewords in a one-to-one mapping relationship with S different values of the K bits, S is less than or equal to $2^K$, each codeword in the S codewords is a complex number vector that includes F complex numbers, a difference between the $i^{th}$ value and the $j^{th}$ value of the K bits is that a value of only one bit is different, a codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$, and a complex number $Z_{j2}$ that are included in the codeword $C_j$, K, F, and S are integers greater than 1, i is not equal to j, and i and j are positive integers less than or equal to S. The apparatus also includes a sending unit, configured to send the codeword $C_K$ by using the F resource units.

With reference to the third aspect, in a first possible implementation manner of the third aspect, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords.

With reference to the third aspect, in a second possible implementation manner of the third aspect, a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords.

With reference to the third aspect, the first possible implementation manner of the third aspect, or the second possible implementation manner of the third aspect, in a third possible implementation manner of the third aspect, the obtaining unit is specifically configured to: when a modulation order corresponding to the codebook is M, obtain $\log_2$ (M) bits from each layer of data stream in W layers of data streams to form the K bits, where W and M are integers greater than 1.

With reference to the third aspect, the first possible implementation manner of the third aspect, the second possible implementation manner of the third aspect, or the third possible implementation manner of the third aspect, in a fourth possible implementation manner of the third aspect, the codebook includes a part or all of codewords in a codebook 1 in the embodiments of the present invention when K is equal to 6.

With reference to the third aspect, the first possible implementation manner of the third aspect, the second possible implementation manner of the third aspect, or the third possible implementation manner of the third aspect, in a fifth possible implementation manner of the third aspect, the codebook includes a part or all of codewords in a codebook 2 in the embodiments of the present invention when K is equal to 12.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner of the third aspect, the data transmission apparatus is deployed on a user terminal or a base station, or the data transmission apparatus is a user terminal or a base station.

A fourth aspect of the present invention provides a data transmission apparatus. The apparatus also includes an obtaining unit, configured to obtain to-be-transmitted K bits. The apparatus also includes a mapping unit, configured to map the K bits to F resource units, where each bit in the K bits is mapped to at least two resource units in the F resource units, and K and F are integers greater than 1. The apparatus also includes a sending unit, configured to map the bits mapped to the F resource units to a modulation symbol for transmission.

With reference to the fourth aspect, in a first possible implementation manner of the fourth aspect, the mapping unit is specifically configured to divide the K bits into V bit sequences, and map the V bit sequences to the F resource units, where each bit sequence in the V bit sequences is mapped to at least two resource units in the F resource units, and V is an integer that is greater than 1 and less than or equal to K.

With reference to the first possible implementation manner of the fourth aspect, in a second possible implementation manner of the fourth aspect, the V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units.

With reference to the second possible implementation manner of the fourth aspect, in a third possible implementation manner of the fourth aspect, a resource unit group i in the V resource unit groups includes a resource unit $i_1$ and a resource unit $i_2$, and a resource unit group j in the V resource unit groups includes a resource unit $j_1$ and the resource unit $i_2$.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the sending unit is specifically configured to map, based on a constellation diagram, the bits mapped to the F resource units to the modulation symbol for transmission, where a constellation diagram used for mapping y bits mapped to a resource unit j in the F resource units to the modulation symbol for transmission is a constellation diagram x; if y is an even number, the constellation diagram x is a square Gray constellation that includes $2^y$ constellation points, and/or if y is an odd number, the constellation diagram x is a cross Gray constellation that includes $2^y$ constellation points.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, a bit a in the K bits is mapped to f1 resource units in the F resource units, and a bit b in the K bits is mapped to f2 resource units in the F resource units, where the bit a mapped to the f1 resource units is separately mapped to f1 bit carry positions on the modulation symbol, and the bit b mapped to the f2 resource units is separately mapped to f2 bit carry positions on the modulation symbol; a sum of transmission reliability indicator values corresponding to the f1 bit carry positions is f1$^+$, and a sum of transmission reliability indicator values corresponding to the f2 bit carry positions is f2$^+$, where an absolute value of a difference between f1$^+$ and f2$^+$ is less than or equal to a third threshold; and the bit a and the bit b are any two bits in the K bits; a larger transmission reliability indicator value indicates higher transmission reliability of a corresponding bit carry position, or a smaller transmission reliability indicator value indicates higher transmission reliability of a corresponding bit carry position.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a sixth possible implementation manner of the fourth aspect, a bit c in the K bits is mapped to f3 resource units in the F resource units, and a bit d in the K bits is mapped to f4 resource units in the F resource units, where the bit c mapped to the f3 resource units is separately mapped to f3 bit carry positions on the modulation symbol, and the bit d mapped to the f4 resource units is separately mapped to f4 bit carry positions on the modulation symbol; a sum of transmission reliability indicator values corresponding to the f3 bit carry positions is $f3^+$, and a sum of transmission reliability indicator values corresponding to the f4 bit carry positions is $f4^+$; the bit c and the bit d are any two bits in the K bits; and if importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

With reference to the sixth possible implementation manner of the fourth aspect, in a seventh possible implementation manner of the fourth aspect, the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

A fifth aspect of the present invention provides a data transmission apparatus. The apparatus includes a processor, a memory, and a transmitter that are connected to each other by using a bus. The processor is configured to obtain to-be-transmitted K bits, and map the K bits to F resource units according to a codebook and a value of the K bits, so as to obtain a codeword $C_K$ that is to be transmitted by using the F resource units, where the codebook includes S codewords in a one-to-one mapping relationship with S different values of the K bits, S is less than or equal to $2^K$, each codeword in the S codewords is a complex number vector that includes F complex numbers, a difference between the $i^{th}$ value and the $j^{th}$ value of the K bits is that a value of only one bit is different, a codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$ and a complex number $Z_{j2}$ that are included in the codeword $C_j$, K, F, and S are integers greater than 1, i is not equal to j, and i and j are positive integers less than or equal to S. The transmitter is configured to send the codeword $C_K$ by using the F resource units.

With reference to the fifth aspect, in a first possible implementation manner of the fifth aspect, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords.

With reference to the fifth aspect, in a second possible implementation manner of the fifth aspect, a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords.

With reference to the fifth aspect, the first possible implementation manner of the fifth aspect, or the second possible implementation manner of the fifth aspect, in a third possible implementation manner of the fifth aspect, the processor is configured to: when a modulation order corresponding to the codebook is M, obtain $\log_2$ (M) bits from each layer of data stream in W layers of data streams to form the K bits, where W and M are integers greater than 1.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, the codebook includes a part or all of codewords in a codebook 1 in the embodiments of the present invention when K is equal to 6.

With reference to the fifth aspect, the first possible implementation manner of the fifth aspect, the second possible implementation manner of the fifth aspect, or the third possible implementation manner of the fifth aspect, in a fifth possible implementation manner of the fifth aspect, the codebook includes a part or all of codewords in a codebook 2 in the embodiments of the present invention when K is equal to 12.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a sixth possible implementation manner of the fifth aspect, the data transmission apparatus is deployed on a user terminal or a base station, or the data transmission apparatus is a user terminal or a base station.

A sixth aspect of the present invention provides a data transmission apparatus. The apparatus includes a processor, a memory, and a transmitter that are connected to each other by using a bus. The processor is configured to obtain to-be-transmitted K bits, and map the K bits to F resource units, where each bit in the K bits is mapped to at least two resource units in the F resource units, and K and F are integers greater than 1. The transmitter is configured to map the bits mapped to the F resource units to a modulation symbol for transmission.

With reference to the sixth aspect, in a first possible implementation manner of the sixth aspect, the processor is configured to divide the K bits into V bit sequences, and map the V bit sequences to the F resource units, where each bit sequence in the V bit sequences is mapped to at least two resource units in the F resource units, and V is an integer that is greater than 1 and less than or equal to K.

With reference to the first possible implementation manner of the sixth aspect, in a second possible implementation manner of the sixth aspect, the V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units.

With reference to the second possible implementation manner of the sixth aspect, in a third possible implementation manner of the sixth aspect, a resource unit group i in the V resource unit groups includes a resource unit $i_1$ and a resource unit $i_2$, and a resource unit group j in the V resource unit groups includes a resource unit $j_1$ and the resource unit $i_2$.

With reference to the sixth aspect, the first possible implementation manner of the sixth aspect, the second possible implementation manner of the sixth aspect, or the third possible implementation manner of the sixth aspect, in a fourth possible implementation manner of the sixth aspect, the transmitter is specifically configured to map, based on a constellation diagram, the bits mapped to the F resource units to the modulation symbol for transmission, where a constellation diagram used for mapping y bits mapped to a resource unit j in the F resource units to the modulation symbol for transmission is a constellation diagram x; if y is an even number, the constellation diagram x is a square Gray constellation that includes $2^y$ constellation points, and/or if y is an odd number, the constellation diagram x is a cross Gray constellation that includes $2^y$ constellation points.

With reference to the sixth aspect, the first possible implementation manner of the sixth aspect, the second possible implementation manner of the sixth aspect, the third possible implementation manner of the sixth aspect, or the fourth possible implementation manner of the sixth aspect, in a fifth possible implementation manner of the sixth aspect, a bit a in the K bits is mapped to f1 resource units in the F resource units, and a bit b in the K bits is mapped to f2 resource units in the F resource units, where the bit a mapped to the f1 resource units is separately mapped to f1 bit carry positions on the modulation symbol, and the bit b mapped to the f2 resource units is separately mapped to f2 bit carry positions on the modulation symbol; a sum of transmission reliability indicator values corresponding to the f1 bit carry positions is $f1^+$, and a sum of transmission reliability indicator values corresponding to the f2 bit carry positions is $f2^+$, where an absolute value of a difference between $f1^+$ and $f2^+$ is less than or equal to a third threshold; and the bit a and the bit b are any two bits in the K bits; a larger transmission reliability indicator value indicates higher transmission reliability of a corresponding bit carry position, or a smaller transmission reliability indicator value indicates higher transmission reliability of a corresponding bit carry position.

With reference to the sixth aspect, the first possible implementation manner of the sixth aspect, the second possible implementation manner of the sixth aspect, the third possible implementation manner of the sixth aspect, or the fourth possible implementation manner of the sixth aspect, in a sixth possible implementation manner of the sixth aspect, a bit c in the K bits is mapped to f3 resource units in the F resource units, and a bit d in the K bits is mapped to f4 resource units in the F resource units, where the bit c mapped to the f3 resource units is separately mapped to f3 bit carry positions on the modulation symbol, and the bit d mapped to the f4 resource units is separately mapped to f4 bit carry positions on the modulation symbol; a sum of transmission reliability indicator values corresponding to the f3 bit carry positions is $f3^+$, and a sum of transmission reliability indicator values corresponding to the f4 bit carry positions is $f4^+$; the bit c and the bit d are any two bits in the K bits; and if importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

With reference to the sixth possible implementation manner of the sixth aspect, in a seventh possible implementation manner of the sixth aspect, the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or the to-be-transmitted K bits are obtained by performing, based on a low density parity check code, channel coding on Wo original data streams corresponding to W users, a degree of the bit c is greater than a degree of the bit d, and the importance of the bit c is greater than the importance of the bit d.

It can be learned that in some technical solutions of the embodiments of the present invention, a transmit end maps to-be-transmitted K bits to F resource units, where each bit in the K bits is mapped to at least two resource units in the F resource units, and K and F are integers greater than 1; and maps the bits mapped to the F resource units to a modulation symbol for transmission. Because each to-be-transmitted bit is mapped to at least two resource units in the F resource units, that is, each bit is redundantly transmitted on at least two resource units when data is being transmitted, bit transmission reliability is improved to some extent.

In other technical solutions of the embodiments of the present invention, according to a codebook and a value of to-be-transmitted K bits, a transmit end maps the K bits to F resource units to obtain a codeword $C_K$ that is to be transmitted by using the F resource units, where because the codebook includes S codewords in a one-to-one mapping relationship with S different values of the K bits, each codeword in the S codewords is a complex number vector that includes F complex numbers. When a difference between the $i^{th}$ value and the $j^{th}$ value of the K bits is that a value of only one bit is different, a codeword that is included in the codebook and in a mapping relationship with the $i^{th}$ value is a codeword $C_i$, a codeword that is included in the codebook and in a mapping relationship with the $j^{th}$ value is a codeword $C_j$, and the codeword $C_i$ does not include a complex number $Z_{j1}$ and a complex number $Z_{j2}$ that are included in the codeword $C_j$, if a value of a bit in the K bits is changed, at least two complex numbers in a corresponding codeword are changed accordingly. Complex numbers in a codeword are in a one-to-one mapping relationship with the resource units, that is, each bit in the K bits is mapped to at least two resource units in the F resource units. Because each to-be-transmitted bit is mapped to at least two resource units in the F resource units, that is, each bit is redundantly transmitted on at least two resource units when data is being transmitted, bit transmission reliability is improved to some extent.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a schematic flowchart of a data transmission method according to an embodiment of the present invention;

FIG. 2-a is a schematic flowchart of a data transmission method according to an embodiment of the present invention;

FIG. 2-b is a schematic diagram of a constellation diagram according to an embodiment of the present invention;

FIG. 2-c is a schematic diagram of mapping a bit sequence to a resource unit according to an embodiment of the present invention;

FIG. 2-d is a schematic diagram of computation amount comparison according to an embodiment of the present invention;

FIG. 2-e is another schematic diagram of computation amount comparison according to an embodiment of the present invention;

FIG. 2-f is a schematic diagram of bit error rate simulation and comparison according to an embodiment of the present invention;

DETAILED DESCRIPTION OF ILLUSTRATIVE EMBODIMENTS

Figure 3:
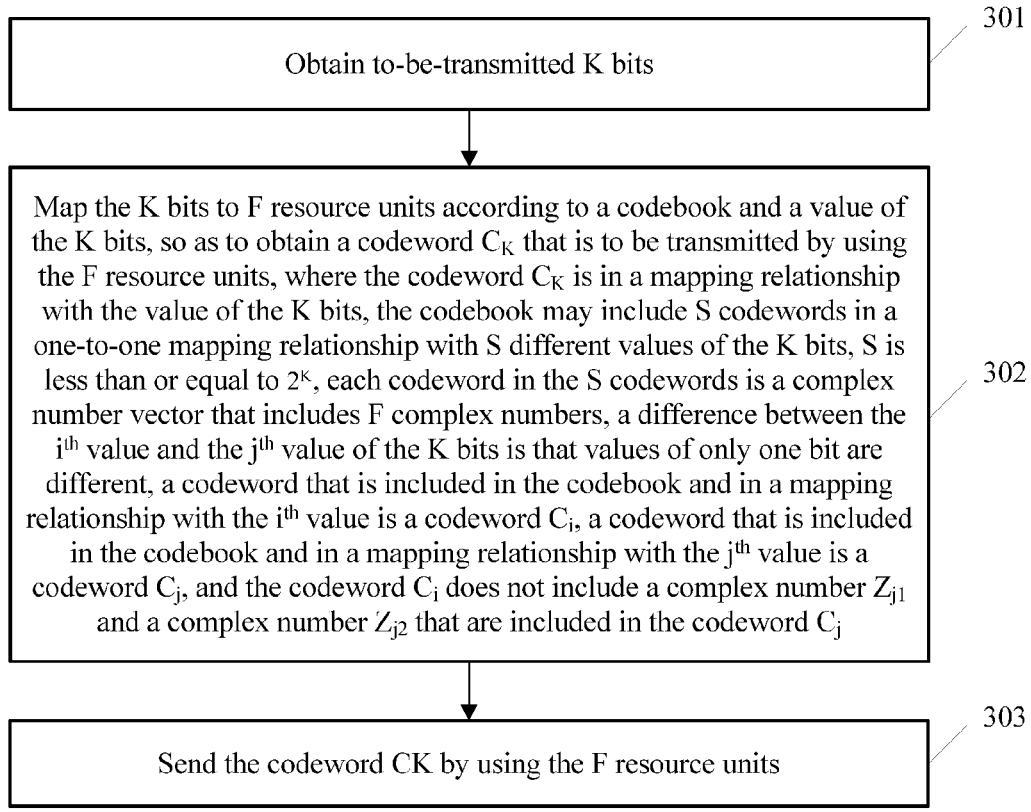
FIG. 3 is a schematic flowchart of a data transmission method according to an embodiment of the present invention.

Embodiments of the present invention provide a data transmission method, a related device, and a communications system, so as to improve bit transmission reliability.

To make the invention objectives, features, and advantages of the present invention clearer and more comprehensible, the following describes the technical solutions in the embodiments of the present invention with reference to the accompanying drawings in the embodiments of the present invention. Apparently, the embodiments described are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "possessing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In an embodiment of the data transmission method of the present invention, the data transmission method includes: obtaining to-be-transmitted K bits; mapping the K bits to F resource units, where each bit in the K bits is mapped to at least two resource units in the F resource units, and K and F are integers greater than 1; and mapping the bits mapped to the F resource units to a modulation symbol for transmission.

Referring to FIG. 1, FIG. 1 is a schematic flowchart of a data transmission method according to an embodiment of the present invention. For example, as shown in FIG. 1, the data transmission method provided in this embodiment of the present invention may include the following steps.

101. Obtain to-be-transmitted K bits.

The K bits are obtained by performing channel coding on original data streams corresponding to W users, where W is a positive integer. For example, W may be equal to 1, 2, 3, 4, 6, 8, or another value. That is, the K bits are bits obtained by performing channel coding.

For example, the K bits are obtained by performing, based on a low density parity check code (English: low density parity check code, LDPC for short), a turbo code, or another code, channel coding on the original data streams corresponding to the W users. Each user in the W users may correspond to one or more original data streams.

102. Map the K bits to F resource units, where each bit in the K bits is mapped to at least two resource units in the F resource units, and K and F are integers greater than 1.

The resource unit mentioned in this embodiment of the present invention refers to a resource unit of an air interface.

For example, K may be equal to 2, 3, 4, 5, 7, 8, 10, 50, 101, 505, 2029, or another value. The K bits may be from one or more data streams. If the K bits are from multiple data streams, the multiple data streams may be data streams corresponding to one or more users. It may be understood that because a value of K may be any integer greater than 1, the technical solution of this embodiment may be a data transmission method for any rate.

Importance of all bits in the K bits may be the same or different.

103. Map the bits mapped to the F resource units to a modulation symbol for transmission.

It can be learned that in the technical solution of this embodiment, to-be-transmitted K bits are mapped to F resource units, where each bit in the K bits is mapped to at least two resource units in the F resource units, and K and F are integers greater than 1; and the bits mapped to the F resource units are mapped to a modulation symbol for transmission. Because each to-be-transmitted bit is mapped to at least two resource units in the F resource units, that is, each bit is redundantly transmitted on at least two resource units when data is being transmitted, bit transmission reliability is improved to some extent.

Optionally, in some possible implementation manners of the present invention, the mapping the K bits to F resource units may include: dividing the K bits into V bit sequences, and mapping the V bit sequences to the F resource units, where each bit sequence in the V bit sequences is mapped to at least two resource units in the F resource units, and V is an integer that is greater than 1 and less than or equal to K.

Optionally, in some possible implementation manners of the present invention, the dividing the K bits into V bit sequences may include: dividing the K bits into the V bit sequences by using a random algorithm, a pseudo-random algorithm, an importance equalization algorithm, or another algorithm.

It may be understood that when V is equal to K, it indicates that each bit in the K bits is classified as one bit sequence. When V is less than K, it indicates that at least one bit sequence in the V bit sequences includes at least two bits in the K bits. Quantities of bits included in two bit sequences in the V bit sequences may be the same or different. For example, when K is equal to 20, and V is equal to 20, it indicates that each bit in 20 bits is classified as one bit sequence. For another example, when K is equal to 20, and V is equal to 5, it indicates that 20 bits are divided into five bit sequences. The five bit sequences do not necessarily include a same quantity of bits. It is possible that a bit sequence includes one bit, a bit sequence includes three bits, a bit sequence includes six bits, and a bit sequence includes another quantity of bits. It may be understood that, compared with mapping that uses a bit as a granularity, mapping that uses a bit sequence as a granularity helps reduce mapping complexity.

Importance of all bits in a same bit sequence may be the same or different. That importance of all bits in a same bit sequence is different means that importance of all bits in the same bit sequence is different from each other, or means that importance of a part of all bits in the same bit sequence is the same. Importance of bits in two different bit sequences may be the same or different. That importance of bits in two different bit sequences is different means that importance of each bit in one bit sequence is different from that of each bit in the other bit sequence or importance of a part of all bits in one bit sequence is the same as that of a part of all bits in the other bit sequence.

The V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units. Optionally, a resource unit group i in the V resource unit groups includes a resource unit $i_1$ and a resource unit $i_2$, and a resource unit group j in the V resource unit groups includes a resource unit $j_1$ and the resource unit $i_2$. That is, an intersection set of resource units included in the resource unit group i and the resource unit group j in the V resource unit groups is a nonempty set. Certainly, in another possible implementation manner, an intersection set of resource units included in any two resource unit groups in the V resource unit groups may be an empty set.

Optionally, in some possible implementation manners of the present invention, a difference between a quantity of bit sequences mapped to a resource unit m1 in the V bit sequences and a quantity of bit sequences mapped to a resource unit n1 in the V bit sequences is less than or equal to a first threshold, where the resource unit m1 and the resource unit n1 are any two (or two specific) resource units in the F resource units. That is, quantities of bit sequences mapped to different resource units may be as even as possible to some extent. Certainly, in some scenarios, this evenness problem may not be considered. A value of the first threshold may be determined according to a specific evenness requirement. For example, the first threshold may be equal to 1, 3, 6, 9, 10, 21, or another value.

Still optionally, in some possible implementation manners of the present invention, a difference between a quantity of bits mapped to a resource unit m2 in the K bits and a quantity of bits mapped to a resource unit n2 in the K bits is less than or equal to a second threshold, where the resource unit m2 and the resource unit n2 are any two (or two specific) resource units in the F resource units. That is, quantities of bits mapped to different resource units may be as even as possible to some extent. Certainly, in some scenarios, this evenness problem may not be considered. A value of the second threshold may be determined according to a specific evenness requirement. For example, the second threshold may be equal to 1, 2, 3, 5, 9, 10, 21, or another value.

Optionally, in some possible implementation manners of the present invention, the mapping the bits mapped to the F resource units to a modulation symbol for transmission includes: mapping, based on a constellation diagram (or in another manner), the bits mapped to the F resource units to the modulation symbol for transmission.

Optionally, in some possible implementation manners of the present invention, a constellation diagram used for mapping y bits mapped to a resource unit j in the F resource units to the modulation symbol for transmission is a constellation diagram x, where the constellation diagram x corresponds to a value of y.

A correspondence between the constellation diagram x and the value of y may be specifically varied. Optionally, in some possible implementation manners of the present invention, if y is an even number, the constellation diagram x is a square Gray constellation that includes $2^y$ constellation points, and/or if y is an odd number, the constellation diagram x is a cross Gray constellation that includes $2^y$ constellation points.

Optionally, in some possible implementation manners of the present invention, a bit a in the K bits is mapped to f1 resource units in the F resource units, and a bit b in the K bits is mapped to f2 resource units in the F resource units. The bit a mapped to the ft resource units is separately mapped to f1 bit carry positions on the modulation symbol, and the bit b mapped to the f2 resource units is separately mapped to f2 bit carry positions on the modulation symbol. A sum of transmission reliability indicator values corresponding to the ft bit carry positions is $f1^+$, and a sum of transmission reliability indicator values corresponding to the f2 bit carry positions is $f2^+$, where an absolute value of a difference between $f1^+$ and $f2^+$ is less than or equal to the third threshold. The bit a and the bit b may be any two bits (or two specific bits) in the K bits. A larger transmission reliability indicator value indicates higher transmission reliability of a corresponding bit carry position, or a smaller transmission reliability indicator value indicates higher transmission reliability of a corresponding bit carry position. It may be understood that because transmission reliability corresponding to all bits is as even as possible, transmission reliability of the entire bits is improved.

Still optionally, in some possible implementation manners of the present invention, a bit c in the K bits is mapped to f3 resource units in the F resource units, and a bit d in the K bits is mapped to f4 resource units in the F resource units. The bit c mapped to the f3 resource units is separately mapped to f3 bit carry positions on the modulation symbol, and the bit d mapped to the f4 resource units is separately mapped to f4 bit carry positions on the modulation symbol. A sum of transmission reliability indicator values corresponding to the f3 bit carry positions is $f3^+$, and a sum of transmission reliability indicator values corresponding to the f4 bit carry positions is $f4^+$. The bit c and the bit d are any two bits (or two specific bits) in the K bits. If importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$. It may be understood that because transmission reliability corresponding to a bit of high importance is greater than transmission reliability corresponding to a bit of low importance, the bit of high importance is transmitted as reliably as possible, which helps improve transmission reliability of the bit of high importance.

The foregoing any data transmission method provided in this embodiment may be executed by, for example, a user terminal or a base station.

For ease of better understanding and implementation of the foregoing solution of this embodiment of the present invention, some specific application scenarios are used as examples in the following description.

Referring to FIG. 2-a, FIG. 2-a is a schematic flowchart of a data transmission method according to another embodiment of the present invention. For example, as shown in FIG. 2-a, the data transmission method provided in the another embodiment of the present invention may include the following steps.

201. Obtain $W_0$ original data streams corresponding to W users.

Each user in the W users may correspond to one or more original data streams, where W is a positive integer. For example, W may be equal to 1, 2, 3, 4, 6, 8, 9, 16, or another value. $W_0$ is a positive integer greater than or equal to W. For example, $W_0$ may be equal to 1, 2, 3, 4, 6, 8, 9, 16, or another value.

202. Perform channel coding on the $W_0$ original data streams corresponding to the W users to obtain to-be-transmitted K bits.

K is an integer greater than 1.

The $W_0$ original data streams corresponding to the W users include $K_0$ bits in total.

$K_0$=K×R, where R is a coding rate of the channel coding.

In some possible implementation manners of the present invention, the channel coding may be performed, based on a low density parity check code or a turbo code or in another channel coding manner, on the $W_0$ original data streams corresponding to the W users to obtain the to-be-transmitted K bits.

At least one codeword may be obtained by performing channel coding on each original data stream corresponding to the W users, and each codeword may include at least one data stream. For example, it is assumed that one original data stream corresponding to one user is obtained, and it is assumed that four codewords are obtained by performing channel coding on the one original data stream corresponding to the one user, where each codeword may include three data streams and each data stream in the three data streams includes n bits; in this case, K=n×3×4. For another example, it is assumed that two original data streams corresponding to two users are obtained, and four codewords may be obtained by performing channel coding on the two original data streams corresponding to the two users, where each codeword includes two data streams and each data stream in the two data streams includes n bits; in this case, K=n×2×4. Other cases can be deduced from this.

203. Divide the K bits into V bit sequences.

Optionally, in some possible implementation manners of the present invention, the dividing the K bits into V bit sequences may include: dividing the K bits into the V bit sequences by using a random algorithm, a pseudo-random algorithm, an importance equalization algorithm, or another algorithm.

204. Map the V bit sequences to F resource units.

V is an integer that is greater than 1 and less than or equal to K.

Each bit sequence in the V bit sequences is mapped to at least two resource units in the F resource units.

It may be understood that when V is equal to K, it indicates that each bit in the K bits is classified as one bit sequence. When V is less than K, it indicates that at least one bit sequence in the V bit sequences includes at least two bits in the K bits. Quantities of bits included in two bit sequences in the V bit sequences may be the same or different. For example, when K is equal to 20, and V is equal to 20, it indicates that each bit in 20 bits is classified as one bit sequence. For another example, when K is equal to 20, and V is equal to 5, it indicates that 20 bits are divided into five bit sequences. The five bit sequences do not necessarily include a same quantity of bits. It is possible that a bit sequence includes one bit, a bit sequence includes three bits, a bit sequence includes six bits, and a bit sequence includes another quantity of bits. It may be understood that, compared with mapping that uses a bit as a granularity, mapping that uses a bit sequence as a granularity helps reduce mapping complexity.

The V bit sequences are mapped to V resource unit groups, and the V resource unit groups include different resource units. A set of all resource units included in the V resource unit groups is a subset of a set of the F resource units. Quantities of resource units included in the V resource unit groups may be equal or not equal.

The V resource unit groups are in a one-to-one correspondence with the V bit sequences.

Each resource unit group in the V resource unit groups includes at least two resource units in the F resource units. It may be understood that because each resource unit group includes at least two resource units in the F resource units, each bit sequence in the V bit sequences is mapped to at least two resource units.

For example, a resource unit group i in the V resource unit groups includes a resource unit $i_1$ and a resource unit $i_2$, and a resource unit group j in the V resource unit groups includes a resource unit $j_1$ and the resource unit $i_2$. If a bit sequence v1 in the V bit sequences is mapped to the resource unit group i, it indicates that the bit sequence v1 is mapped to the resource unit $i_1$ and the resource unit $i_2$ in the resource unit group i. If a bit sequence v2 in the V bit sequences is mapped to the resource unit group j, it indicates that the bit sequence v2 is mapped to the resource unit $j_1$ and the resource unit $i_2$ in the resource unit group j. That is, an intersection set of resource units included in the resource unit group i and the resource unit group j in the V resource unit groups is a nonempty set. The resource unit group i and the resource unit group j in the V resource unit groups may be two specific or any two resource unit groups in the V resource unit groups. It may be understood that when the intersection set of resource units included in the resource unit group i and the resource unit group j in the V resource unit groups is a nonempty set, it indicates that resource units to which the two bit sequences are mapped are not entirely different. This can implement, to some extent, that some bit sequences are non-orthogonally mapped to resource units. Because this redundant mapping manner is relatively flexible, flexibility and controllability of a modulation rate are improved.

In some other possible implementation manners, an intersection set of resource units included in any two resource unit groups in the V resource unit groups may be an empty set, that is, any resource unit in the F resource units may belong to only one resource unit group in the V resource unit groups.

Optionally, in some possible implementation manners of the present invention, a difference between a quantity of bit sequences mapped to a resource unit m1 in the V bit sequences and a quantity of bit sequences mapped to a resource unit n1 in the V bit sequences is less than or equal to a first threshold, where the resource unit m1 and the resource unit n1 are any two (or two specific) resource units in the F resource units. That is, quantities of bit sequences mapped to different resource units may be as even as possible to some extent. Certainly, in some scenarios, this evenness problem may not be considered. A value of the first threshold may be determined according to a specific evenness requirement. For example, the first threshold may be equal to 1, 3, 6, 9, 10, 21, or another value.

Still optionally, in some possible implementation manners of the present invention, a difference between a quantity of bits mapped to a resource unit m2 in the K bits and a quantity of bits mapped to a resource unit n2 in the K bits is less than or equal to a second threshold, where the resource unit m2 and the resource unit n2 are any two (or two specific) resource units in the F resource units. That is, quantities of bits mapped to different resource units may be as even as possible to some extent. Certainly, in some scenarios, this evenness problem may not be considered. A value of the second threshold may be determined according to a specific evenness requirement. For example, the second threshold may be equal to 1, 2, 3, 5, 9, 10, 21, or another value.

205. Map the bits mapped to the F resource units to a modulation symbol for transmission.

Optionally, in some possible implementation manners of the present invention, the mapping the bits mapped to the F resource units to a modulation symbol for transmission includes: mapping, based on a constellation diagram (or in another manner), the bits mapped to the F resource units to the modulation symbol for transmission. A constellation diagram used for mapping bits mapped to a resource unit j in the F resource units to the modulation symbol for transmission may be the same as or different from a constellation diagram used for mapping bits mapped to a resource unit i in the F resource units to the modulation symbol for transmission, where the resource unit j and the resource unit i may be two specific or any two resource units in the F resource units.

Optionally, in some possible implementation manners of the present invention, a constellation diagram used for mapping y bits mapped to a resource unit j in the F resource units to the modulation symbol for transmission is a constellation diagram x, where the constellation diagram x corresponds to a value of y.

A correspondence between the constellation diagram x and the value of y may be specifically varied. Optionally, in some possible implementation manners of the present invention, if y is an even number, the constellation diagram x is a square Gray constellation that includes $2^y$ constellation points, and/or if y is an odd number, the constellation diagram x is a cross Gray constellation that includes $2^y$ constellation points.

For example, as shown in FIG. 2-*b*, for a resource unit, if the resource unit carries y bits each time, a constellation diagram that includes $2^y$ constellation points is selected. Constellation point mapping: A corresponding constellation point in the constellation diagram may be selected according to a bit mapping relationship and a value of the y bits. For example, constellation diagrams corresponding to several different values of y are shown in FIG. 2-*b*.

Optionally, in some possible implementation manners of the present invention, a bit a in the K bits is mapped to f1 resource units in the F resource units, and a bit b in the K bits is mapped to f2 resource units in the F resource units. The bit a mapped to the f1 resource units is separately mapped to f1 bit carry positions on the modulation symbol, and the bit b mapped to the f2 resource units is separately mapped to f2 bit carry positions on the modulation symbol. A sum of transmission reliability indicator values corresponding to the f1 bit carry positions is $f1^+$, and a sum of transmission reliability indicator values corresponding to the f2 bit carry positions is $f2^+$, where an absolute value of a difference between $f1^+$ and $f2^+$ is less than or equal to the third threshold. The bit a and the bit b may be any two bits (or two specific bits) in the K bits. A larger transmission reliability indicator value indicates higher transmission reliability of a corresponding bit carry position, or a smaller transmission reliability indicator value indicates higher transmission reliability of a corresponding bit carry position.

The following gives an example of a balance control manner for transmission reliability of all bits in the K bits. If y bits are mapped to a resource unit, a corresponding constellation diagram is determined according to y. Bit transmission reliability corresponding to the y bits is determined according to the constellation diagram, and a weighted value wk (k=1, . . . , or y) is separately assigned to the y bits. Same or similar initial weighted values Bi are assigned to all the bits in the K bits. When bit mapping is being performed, each bit is positioned according to a weight of the bit. A bit with a large weighted value is positioned at a bit carry position of high reliability, and Bi is updated to Bi-wk. Then, the bit mapping continues to be performed in a similar manner based on updated Bi.

Still optionally, in some possible implementation manners of the present invention, a bit c in the K bits is mapped to f3 resource units in the F resource units, and a bit d in the K bits is mapped to f4 resource units in the F resource units. The bit c mapped to the f3 resource units is separately mapped to f3 bit carry positions on the modulation symbol, and the bit d mapped to the f4 resource units is separately mapped to f4 bit carry positions on the modulation symbol. A sum of transmission reliability indicator values corresponding to the f3 bit carry positions is $f3^+$, and a sum of transmission reliability indicator values corresponding to the f4 bit carry positions is $f4^+$. The bit c and the bit d are any two bits (or two specific bits) in the K bits. If importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

Certainly, in some other possible implementation manners of the present invention, the bits mapped to the F resource units may be mapped to the modulation symbol for transmission in a random manner or another manner. Importance of each bit mapped to the F resource units and reliability of each bit carry position are not considered when the bits mapped to the F resource units are mapped to the modulation symbol in the random manner.

The foregoing any data transmission method provided in this embodiment may be executed by, for example, a user terminal or a base station.

It can be learned that in the technical solution of this embodiment, after $W_0$ original data streams corresponding to W users are obtained, channel coding is performed on the $W_0$ original data streams corresponding to the W users to obtain to-be-transmitted K bits; the to-be-transmitted K bits are mapped to F resource units, where each bit in the K bits is mapped to at least two resource units in the F resource units; and the bits mapped to the F resource units are mapped to a modulation symbol for transmission. Because each to-be-transmitted bit obtained by channel coding is mapped to at least two resource units in the F resource units, that is, each bit is redundantly transmitted on at least two resource units when data is being transmitted, bit transmission reliability is improved to some extent.

The following describes, with reference to the accompany drawing, a mechanism for mapping the V bit sequences to the F resource units.

For example, as shown in FIG. 2-c, it is assumed that a quantity of available resource units is F, and all bit sequences in the V bit sequences are positioned on different intermediate nodes in V intermediate nodes (each intermediate node may be a memory area). If each intermediate node is connected to a maximum of $d_v$ resource units, a quantity of intermediate nodes is V, and each resource unit is connected to a maximum of $d_f$ intermediate nodes:

$$V = C_F^{d_v} \quad d_f = \frac{Vd_v}{F}$$

A connection relationship between an intermediate node and a resource unit presented by a connection network may be represented by a traverse value of a combination. That is, all combinations of selecting $d_v$ resource units from the F resource units are traversed, and there are $C_F^{d_v}$ combinations in total. For example, a sequence number of a resource unit connected to the $i^{th}$ intermediate node is a bit value (for example, 0 represents disconnected, and 1 represents connected) of the $i^{th}$ combination.

Based on some of the foregoing technical solutions of this embodiment, signal decoding operation complexity at a receive end is reduced. For example, the receive end may decode, according to a message passing algorithm or another decoding algorithm, a received signal obtained from the F resource units.

For example, referring to FIG. 2-d and FIG. 2-e, FIG. 2-d and FIG. 2-e are diagrams of comparison between receive end computation amount performances corresponding to a conventional SCMA scheme and the solution of the present invention.

FIG. 2-d shows a diagram of comparison between receive end computation amount performances when a modulation order $M_0=4$, a resource unit quantity F=4, and the K bits are divided into V=6 bit sequences. FIG. 2-d shows that a receive end computation amount performance of the solution of the present invention is far better than that of the conventional SCMA scheme.

FIG. 2-e shows a diagram of comparison between receive end computation amount performances when a modulation order $M_0=4$, a resource unit quantity F=8, and the K bits are divided into V=24 bit sequences. FIG. 2-e shows that a receive end computation amount performance of the solution of the present invention is far better than that of the conventional SCMA scheme.

Referring to FIG. 2-f, FIG. 2-f is a simulation diagram of bit error rate performances corresponding to the conventional SCMA scheme, the solution of the present invention, and a low density signature code division multiple access (LDS for short) scheme.

A parametric environment of the simulation diagram shown in FIG. 2-f is as follows.

A modulation mode is 4QAM; spectral efficiency is 1.5; the resource unit quantity F=8; the K bits are divided into V=6 bit sequences; an error-correcting code is a turbo code, where a code rate is ½, a code length is 1992 bits; the turbo code is iterated for a maximum of six times; channel models are a white Gaussian noise channel and a Rayleigh fading channel; and a frame structure may include 14 orthogonal frequency division multiplexing (OFDM for short) symbols and 48 resource blocks.

It can be learned that in some of the foregoing technical solutions of this embodiment, a parameter (such as a quantity of users, a quantity of data stream layers, a quantity of intermediate nodes, or a modulation order) is compatible with SCMA. A scheme based on SCMA may be considered as a special case of the solutions. Moreover, it may be found by means of simulation and contrastive analysis that, compared with several conventional technical solutions, some of the foregoing technical solutions of this embodiment have advantages such as reducing complexity and a bit error rate.

In another embodiment of a data transmission method of the present invention, another data transmission method includes: obtaining to-be-transmitted K bits; mapping the K bits to F resource units according to a codebook and a value of the K bits, so as to obtain a codeword $C_K$ that is to be transmitted by using the F resource units, where the codebook includes S codewords in a one-to-one mapping relationship with S different values of the K bits, S is less than or equal to $2^K$, each codeword in the S codewords is a complex number vector that includes F complex numbers, a difference between the $i^{th}$ value and the $j^{th}$ value of the K bits is that a value of only one bit is different, a codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$ and a complex number $Z_{j2}$ that are included in the codeword $C_j$; and sending the codeword $C_K$ by using the F resource units.

Referring to FIG. 3, FIG. 3 is a schematic flowchart of another data transmission method according to another embodiment of the present invention. For example, as shown in FIG. 3, the another data transmission method provided in the another embodiment of the present invention may include the following steps.

301. Obtain to-be-transmitted K bits.

The K bits are obtained by performing channel coding on original data streams corresponding to W users, where W is a positive integer. For example, W may be equal to 1, 2, 3, 4, 6, 8, or another value. That is, the K bits are bits obtained by performing channel coding.

For example, the K bits are obtained by performing, based on a low density parity check code (LDPC), a turbo code, or another code, channel coding on the original data streams corresponding to the W users. Each user in the W users may correspond to one or more original data streams.

Optionally, in some possible implementation manners of the present invention, the obtaining to-be-transmitted K bits may include: when a modulation order corresponding to the codebook is M, obtaining $\log_2$ (M) bits from each layer of data stream in W layers of data streams to form the K bits, where W and M are integers greater than 1.

302. Map the K bits to F resource units according to a codebook and a value of the K bits, so as to obtain a codeword $C_K$ that is to be transmitted by using the F resource units.

The codeword $C_K$ is in a mapping relationship with the value of the K bits.

The codebook may include S codewords in a one-to-one mapping relationship with S different values of the K bits, where S is less than or equal to $2^K$. Each codeword in the S codewords is a complex number vector that includes F complex numbers. A difference between the $i^{th}$ value and the $j^{th}$ value of the K bits is that a value of only one bit is different. A codeword that is included in the codebook and in a mapping relationship with the $i^{th}$ value is a codeword $C_i$. A codeword that is included in the codebook and in a mapping relationship with the $j^{th}$ value is a codeword $C_j$, and the codeword $C_i$ does not include a complex number $Z_{j1}$ and a complex number $Z_{j2}$ that are included in the codeword $C_j$.

For example, S may be greater than 1, and S may be equal to, for example, 1, 2, 3, 4, 6, 8, 15, 201, 1005, or another value.

Optionally, in some possible implementation manners of the present invention, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords. S1 is less than or equal to S. That is, at least two complex numbers in any two codewords in the S1 codewords are different.

Optionally, in some possible implementation manners of the present invention, a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords. S2 is less than or equal to S. That is, complex numbers of at least two same positions of any two codewords in the S2 codewords are different.

303. Send the codeword $C_K$ by using the F resource units.

The resource unit mentioned in this embodiment of the present invention refers to a resource unit of an air interface.

For example, K may be equal to 2, 3, 4, 5, 7, 8, 10, 50, 101, 505, 2029, or another value. The K bits may be from one or more data streams. If the K bits are from multiple data streams, the multiple data streams may be data streams corresponding to one or more users. It may be understood that because a value of K may be any integer greater than 1, the technical solution of this embodiment may be a data transmission method for any rate.

Importance of all bits in the K bits may be the same or different.

It can be learned that in the solution of this embodiment, according to a codebook and a value of to-be-transmitted K bits, the K bits are mapped to F resource units to obtain a codeword $C_K$ that is to be transmitted by using the F resource units, where because the codebook includes S codewords in a one-to-one mapping relationship with S different values of the K bits, each codeword in the S codewords is a complex number vector that includes F complex numbers. When a difference between the $i^{th}$ value and the $j^{th}$ value of the K bits is that a value of only one bit is different, a codeword that is included in the codebook and in a mapping relationship with the $i^{th}$ value is a codeword $C_i$, a codeword that is included in the codebook and in a mapping relationship with the $j^{th}$ value is a codeword $C_j$, and the codeword $C_i$ does not include a complex number $Z_{j1}$ and a complex number $Z_{j2}$ that are included in the codeword $C_j$, if a value of a bit in the K bits is changed, at least two complex numbers in a corresponding codeword are changed accordingly. Complex numbers in a codeword are in a one-to-one mapping relationship with the resource units, that is, each bit in the K bits is mapped to at least two resource units in the F resource units. Because each to-be-transmitted bit is mapped to at least two resource units in the F resource units, that is, each bit is redundantly transmitted on at least two resource units when data is being transmitted, bit transmission reliability is improved to some extent.

Optionally, in some possible implementation manners of the present invention, when K is equal to 6, the codebook may include one or more codewords in the following codebook 1:

| Codebook 1 | |
|---|---|
| Bit value | Codeword |
| 000000 | 1.2247 + 0.4082i 1.2247 + 0.4082i 1.2247 + 0.4082i 1.2247 + 0.4082i |
| 000001 | −1.2247 + 0.4082i 1.2247 + 0.4082i 1.2247 − 0.4082i 1.2247 + 0.4082i |
| 000010 | 1.2247 + 0.4082i 0.4082 + 0.4082i 1.2247 + 0.4082i −1.2247 + 0.4082i |
| 000011 | −1.2247 + 0.4082i 0.4082 + 0.4082i 1.2247 − 0.4082i −1.2247 + 0.4082i |
| 000100 | 1.2247 + 0.4082i −1.2247 + 0.4082i 0.4082 + 0.4082i 1.2247 + 0.4082i |
| 000101 | −1.2247 + 0.4082i −1.2247 + 0.4082i 0.4082 − 0.4082i 1.2247 + 0.4082i |
| 000110 | 1.2247 + 0.4082i −0.4082 + 0.4082i 0.4082 + 0.4082i −1.2247 + 0.4082i |
| 000111 | −1.2247 + 0.4082i −0.4082 + 0.4082i 0.4082 − 0.4082i −1.2247 + 0.4082i |
| 001000 | 1.2247 − 0.4082i 1.2247 + 0.4082i 1.2247 + 0.4082i 1.2247 − 0.4082i |
| 001001 | −1.2247 − 0.4082i 1.2247 + 0.4082i 1.2247 + 0.4082i 1.2247 − 0.4082i |
| 001010 | 1.2247 − 0.4082i 0.4082 + 0.4082i 1.2247 + 0.4082i −1.2247 − 0.4082i |
| 001011 | −1.2247 − 0.4082i 0.4082 + 0.4082i 1.2247 − 0.4082i −1.2247 + 0.4082i |
| 001100 | 1.2247 − 0.4082i −1.2247 + 0.4082i 0.4082 + 0.4082i 1.2247 − 0.4082i |
| 001101 | −1.2247 − 0.4082i −1.2247 + 0.4082i 0.4082 − 0.4082i 1.2247 − 0.4082i |
| 001110 | 1.2247 − 0.4082i −0.4082 + 0.4082i 0.4082 + 0.4082i −1.2247 − 0.4082i |
| 001111 | −1.2247 − 0.4082i −0.4082 + 0.4082i 0.4082 − 0.4082i −1.2247 − 0.4082i |
| 010000 | 1.2247 + 0.4082i 1.2247 + 0.4082i −1.2247 + 0.4082i 0.4082 + 0.4082i |
| 010001 | 1.2247 + 0.4082i −1.2247 + 0.4082i −1.2247 − 0.4082i 0.4082 + 0.4082i |
| 010010 | 1.2247 + 0.4082i 0.4082 + 0.4082i −1.2247 + 0.4082i −0.4082 + 0.4082i |
| 010011 | −1.2247 + 0.4082i 0.4082 + 0.4082i −1.2247 + 0.4082i −0.4082 + 0.4082i |
| 010100 | 1.2247 + 0.4082i −1.2247 + 0.4082i −0.4082 + 0.4082i 0.4082 + 0.4082i |
| 010101 | −1.2247 + 0.4082i −1.2247 + 0.4082i −0.4082 − 0.4082i 0.4082 + 0.4082i |
| 010110 | 1.2247 + 0.4082i −0.4082 + 0.4082i −0.4082 + 0.4082i −0.4082 + 0.4082i |
| 010111 | −1.2247 + 0.4082i −0.4082 + 0.4082i −0.4082 − 0.4082i −0.4082 + 0.4082i |
| 011000 | 1.2247 − 0.4082i 1.2247 + 0.4082i −1.2247 + 0.4082i 0.4082 − 0.4082i |
| 011001 | −1.2247 − 0.4082i 1.2247 + 0.4082i −1.2247 − 0.4082i 0.4082 − 0.4082i |
| 011010 | 1.2247 − 0.4082i 0.4082 + 0.4082i −1.2247 + 0.4082i −0.4082 − 0.4082i |
| 011011 | −1.2247 − 0.4082i 0.4082 + 0.4082i −1.2247 + 0.4082i −0.4082 − 0.4082i |
| 011100 | 1.2247 − 0.4082i −1.2247 + 0.4082i −0.4082 + 0.4082i 0.4082 − 0.4082i |
| 011101 | −1.2247 − 0.4082i −1.2247 + 0.4082i −0.4082 − 0.4082i 0.4082 − 0.4082i |
| 011110 | 1.2247 − 0.4082i −0.4082 + 0.4082i −0.4082 + 0.4082i −0.4082 − 0.4082i |
| 011111 | −1.2247 − 0.4082i −0.4082 + 0.4082i −0.4082 − 0.4082i −0.4082 − 0.4082i |
| 100000 | 0.4082 + 0.4082i 1.2247 − 0.4082i 1.2247 + 0.4082i 1.2247 + 0.4082i |

-continued

Codebook 1

| Bit value | Codeword |
|---|---|
| 100001 | −0.4082 + 0.4082i 1.2247 − 0.4082i 1.2247 − 0.4082i 1.2247 + 0.4082i |
| 100010 | 0.4082 + 0.4082i 0.4082 − 0.4082i 1.2247 + 0.4082i −1.2247 + 0.4082i |
| 100011 | −0.4082 + 0.4082i 0.4082 − 0.4082i 1.2247 − 0.4082i −1.2247 + 0.4082i |
| 100100 | 0.4082 + 0.4082i −1.2247 − 0.4082i 0.4082 + 0.4082i 1.2247 + 0.4082i |
| 100101 | −0.4082 + 0.4082i −1.2247 − 0.4082i 0.4082 − 0.4082i 1.2247 + 0.4082i |
| 100110 | 0.4082 + 0.4082i −0.4082 − 0.4082i 0.4082 + 0.4082i −1.2247 + 0.4082i |
| 100111 | −0.4082 + 0.4082i −0.4082 − 0.4082i 0.4082 − 0.4082i −1.2247 + 0.4082i |
| 101000 | 0.4082 − 0.4082i 1.2247 − 0.4082i 1.2247 + 0.4082i 1.2247 − 0.4082i |
| 101001 | −0.4082 − 0.4082i 1.2247 − 0.4082i 1.2247 − 0.4082i 1.2247 − 0.4082i |
| 101010 | 0.4082 − 0.4082i 0.4082 − 0.4082i 1.2247 + 0.4082i −1.2247 − 0.4082i |
| 101011 | −0.4082 − 0.4082i 0.4082 − 0.4082i 1.2247 − 0.4082i −1.2247 − 0.4082i |
| 101100 | 0.4082 − 0.4082i −1.2247 − 0.4082i 0.4082 + 0.4082i 1.2247 − 0.4082i |
| 101101 | −0.4082 − 0.4082i −1.2247 − 0.4082i 0.4082 − 0.4082i 1.2247 − 0.4082i |
| 101110 | 0.4082 − 0.4082i −0.4082 − 0.4082i 0.4082 + 0.4082i −1.2247 − 0.4082i |
| 101111 | −0.4082 − 0.4082i −0.4082 − 0.4082i 0.4082 − 0.4082i −1.2247 − 0.4082i |
| 110000 | 0.4082 + 0.4082i 1.2247 − 0.4082i −1.2247 + 0.4082i 0.4082 + 0.4082i |
| 110001 | −0.4082 + 0.4082i 1.2247 − 0.4082i −1.2247 − 0.4082i 0.4082 + 0.4082i |
| 110010 | 0.4082 + 0.4082i 0.4082 − 0.4082i −1.2247 + 0.4082i −0.4082 + 0.4082i |
| 110011 | −0.4082 + 0.4082i 0.4082 − 0.4082i −1.2247 − 0.4082i −0.4082 + 0.4082i |
| 110100 | 0.4082 + 0.4082i −1.2247 − 0.4082i −0.4082 + 0.4082i 0.4082 + 0.4082i |
| 110101 | −0.4082 + 0.4082i −1.2247 − 0.4082i −0.4082 − 0.4082i 0.4082 + 0.4082i |
| 110110 | 0.4082 + 0.4082i −0.4082 − 0.4082i −0.4082 + 0.4082i −0.4082 + 0.4082i |
| 110111 | −0.4082 + 0.4082i −0.4082 − 0.4082i −0.4082 − 0.4082i −0.4082 + 0.4082i |
| 111000 | 0.4082 − 0.4082i 1.2247 − 0.4082i −1.2247 + 0.4082i 0.4082 − 0.4082i |
| 111001 | −0.4082 − 0.4082i 1.2247 − 0.4082i −1.2247 − 0.4082i 0.4082 − 0.4082i |
| 111010 | 0.4082 − 0.4082i 0.4082 − 0.4082i −1.2247 + 0.4082i −0.4082 − 0.4082i |
| 111011 | −0.4082 − 0.4082i 0.4082 − 0.4082i −1.2247 − 0.4082i −0.4082 − 0.4082i |
| 111100 | 0.4082 − 0.4082i −1.2247 − 0.4082i −0.4082 + 0.4082i 0.4082 − 0.4082i |
| 111101 | −0.4082 − 0.4082i −1.2247 − 0.4082i −0.4082 − 0.4082i 0.4082 − 0.4082i |
| 111110 | 0.4082 − 0.4082i −0.4082 − 0.4082i −0.4082 + 0.4082i −0.4082 − 0.4082i |
| 111111 | −0.4082 − 0.4082i −0.4082 − 0.4082i −0.4082 − 0.4082i −0.4082 − 0.4082i |

Optionally, in some possible implementation manners of the present invention, when K is equal to 12, the codebook may include one or more codewords in the following codebook 2:

The foregoing any data transmission method provided in this embodiment may be executed by, for example, a user terminal or a base station.

Figure 4:
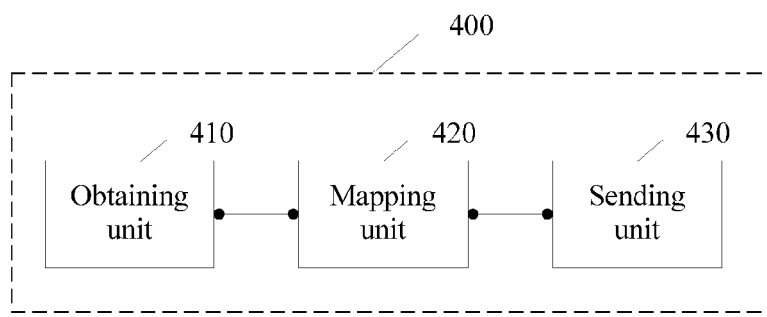
FIG. 4 is a schematic diagram of a data transmission apparatus according to an embodiment of the present invention.

Referring to FIG. 4, an embodiment of the present invention provides a data transmission apparatus 400, which may include: an obtaining unit 410, configured to obtain to-be-transmitted K bits; a mapping unit 420, configured to map the K bits to F resource units according to a codebook and a value of the K bits, so as to obtain a codeword $C_K$ that is to be transmitted by using the F resource units, where the codebook includes S codewords in a one-to-one mapping relationship with S different values of the K bits, S is less than or equal to $2^K$, each codeword in the S codewords is a complex number vector that includes F complex numbers, a difference between the $i^{th}$ value and the $j^{th}$ value of the K bits is that a value of only one bit is different, a codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$ and a complex number $Z_{j2}$ that are included in the codeword $C_j$, K, F, and S are integers greater than 1, i is not equal to j, and i and j are positive integers less than or equal to S; and a sending unit 430, configured to send the codeword $C_K$ by using the F resource units.

Optionally, in some possible implementation manners of the present invention, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords.

Subscripts of the complex number $Z_{q1}$ and the complex number $Z_{q2}$ are not used to limit positions or sequences of the complex number $Z_{q1}$ and the complex number $Z_{q2}$ in the codebook, and what is not specifically described is similar to this.

Optionally, in some possible implementation manners of the present invention, a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords.

Optionally, in some possible implementation manners of the present invention, the obtaining unit is specifically configured to: when a modulation order corresponding to the codebook is M, obtain $\log_2(M)$ bits from each layer of data stream in W layers of data streams to form the K bits, where W and M are integers greater than 1.

Optionally, in some possible implementation manners of the present invention, the codebook includes a part or all of codewords in the codebook 1 in the foregoing embodiment when K is equal to 6.

Optionally, in some possible implementation manners of the present invention, the codebook includes a part or all of codewords in the codebook 2 in the foregoing embodiment when K is equal to 12.

Optionally, in some possible implementation manners of the present invention, the data transmission apparatus 400 is deployed on a user terminal or a base station, or the data transmission apparatus 400 is a user terminal or a base station.

It may be understood that functions of each function module of the data transmission apparatus 400 in this embodiment may be specifically implemented according to the methods in the foregoing method embodiments. For a specific implementation process, reference may be made to related descriptions of the foregoing method embodiments, and details are not described herein.

It can be learned that in some technical solutions of this embodiment, the data transmission apparatus 400 maps to-be-transmitted K bits to F resource units, where each bit in the K bits is mapped to at least two resource units in the F resource units, and K and F are integers greater than 1; and maps the bits mapped to the F resource units to a modulation symbol for transmission. Because each to-be-transmitted bit is mapped to at least two resource units in the F resource units, that is, each bit is redundantly transmitted on at least two resource units when data is being transmitted, bit transmission reliability is improved to some extent.

Figure 5:
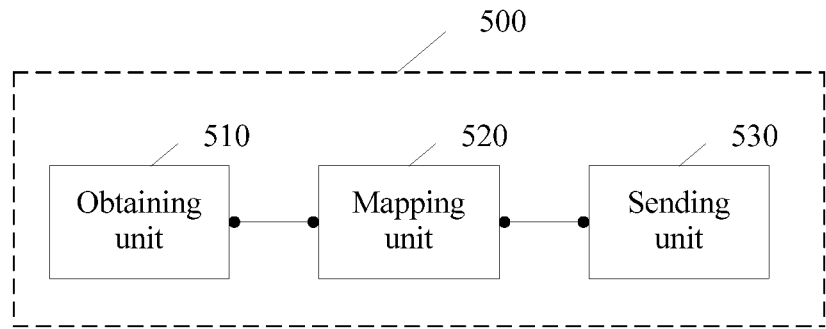
FIG. 5 is a schematic diagram of a data transmission apparatus according to an embodiment of the present invention.

Referring to FIG. 5, an embodiment of the present invention further provides a data transmission apparatus 500, which may include: an obtaining unit 510, configured to obtain to-be-transmitted K bits; a mapping unit 520, configured to map the K bits to F resource units, where each bit in the K bits is mapped to at least two resource units in the F resource units, and K and F are integers greater than 1; and a sending unit 530, configured to map the bits mapped to the F resource units to a modulation symbol for transmission.

Optionally, in some possible implementation manners of the present invention, the mapping unit 520 may be specifically configured to divide the K bits into V bit sequences, and map the V bit sequences to the F resource units, where each bit sequence in the V bit sequences is mapped to at least two resource units in the F resource units, and V is an integer that is greater than 1 and less than or equal to K.

Optionally, in some possible implementation manners of the present invention, the V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units.

Optionally, in some possible implementation manners of the present invention, a resource unit group i in the V resource unit groups includes a resource unit $i_1$ and a resource unit $i_2$, and a resource unit group j in the V resource unit groups includes a resource unit $j_1$ and the resource unit $i_2$.

Optionally, in some possible implementation manners of the present invention, the sending unit 530 is specifically configured to map, based on a constellation diagram, the bits mapped to the F resource units to the modulation symbol for transmission.

A constellation diagram used for mapping y bits mapped to a resource unit j in the F resource units to the modulation symbol for transmission is a constellation diagram x. If y is an even number, the constellation diagram x is a square Gray constellation that includes $2^y$ constellation points, and/or if y is an odd number, the constellation diagram x is a cross Gray constellation that includes $2^y$ constellation points.

Optionally, in some possible implementation manners of the present invention, a bit a in the K bits is mapped to f1 resource units in the F resource units, and a bit b in the K bits is mapped to f2 resource units in the F resource units.

The bit a mapped to the f1 resource units is separately mapped to f1 bit carry positions on the modulation symbol, and the bit b mapped to the f2 resource units is separately mapped to f2 bit carry positions on the modulation symbol. A sum of transmission reliability indicator values corresponding to the f1 bit carry positions is $f1^+$, and a sum of transmission reliability indicator values corresponding to the f2 bit carry positions is $f2^+$, where an absolute value of a difference between $f1^+$ and $f2^+$ is less than or equal to a third threshold.

The bit a and the bit b are any two bits in the K bits. A larger transmission reliability indicator value indicates higher transmission reliability of a corresponding bit carry position, or a smaller transmission reliability indicator value indicates higher transmission reliability of a corresponding bit carry position.

Optionally, in some possible implementation manners of the present invention, a bit c in the K bits is mapped to f3 resource units in the F resource units, and a bit d in the K bits is mapped to f4 resource units in the F resource units.

The bit c mapped to the f3 resource units is separately mapped to f3 bit carry positions on the modulation symbol, and the bit d mapped to the f4 resource units is separately mapped to f4 bit carry positions on the modulation symbol. A sum of transmission reliability indicator values corresponding to the f3 bit carry positions is $f3^+$, and a sum of transmission reliability indicator values corresponding to the f4 bit carry positions is $f4^+$.

The bit c and the bit d are any two bits in the K bits.

If importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

Optionally, in some possible implementation manners of the present invention, the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

It may be understood that functions of each function module of the data transmission apparatus 500 in this embodiment may be specifically implemented according to the methods in the foregoing method embodiments. For a specific implementation process, reference may be made to related descriptions of the foregoing method embodiments, and details are not described herein.

It can be learned that in the technical solution of this embodiment, according to a codebook and a value of to-be-transmitted K bits, the data transmission apparatus 500 maps the K bits to F resource units to obtain a codeword $C_K$ that is to be transmitted by using the F resource units, where because the codebook includes S codewords in a one-to-one mapping relationship with S different values of the K bits, each codeword in the S codewords is a complex number vector that includes F complex numbers. When a difference between the $i^{th}$ value and the $j^{th}$ value of the K bits is that a value of only one bit is different, a codeword that is included in the codebook and in a mapping relationship with the $i^{th}$ value is a codeword $C_i$, a codeword that is included in the codebook and in a mapping relationship with the $j^{th}$ value is a codeword $C_j$, and the codeword $C_i$ does not include a complex number $Z_{j1}$ and a complex number $Z_{j2}$ that are included in the codeword $C_j$, if a value of a bit in the K bits is changed, at least two complex numbers in a corresponding codeword are changed accordingly. Complex numbers in a codeword are in a one-to-one mapping relationship with the F resource units, that is, each bit in the K bits is mapped to at least two resource units in the F resource units. Because each to-be-transmitted bit is mapped to at least two resource units in the F resource units, that is, each bit is redundantly transmitted on at least two resource units when data is being transmitted, bit transmission reliability is improved to some extent.

Figure 6:
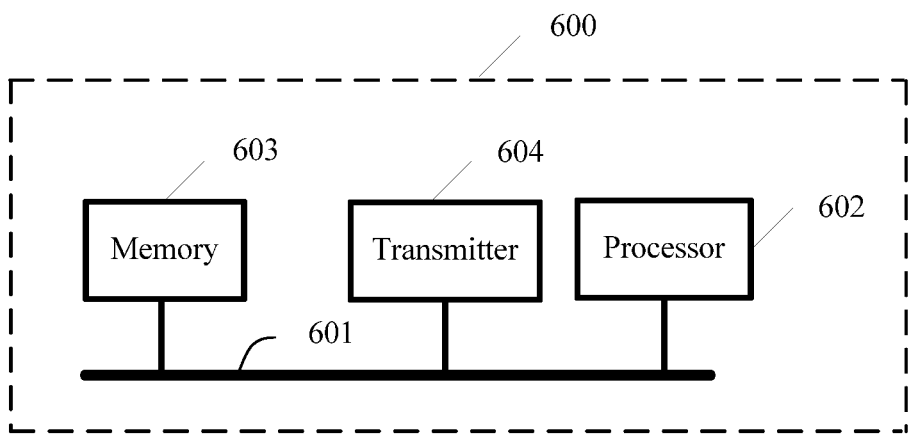
FIG. 6 is a schematic diagram of a data transmission apparatus according to an embodiment of the present invention.

Referring to FIG. 6, an embodiment of the present invention further provides a data transmission apparatus 600, including: a processor 602, a memory 603, and a transmitter 604 that are connected to each other by using a bus 601.

The processor 602 is configured to obtain to-be-transmitted K bits by invoking, by using the bus 601, code stored in the memory 603, and map the K bits to F resource units according to a codebook and a value of the K bits, so as to obtain a codeword $C_K$ that is to be transmitted by using the F resource units. The codebook includes S codewords in a one-to-one mapping relationship with S different values of the K bits, where S is less than or equal to $2^K$. Each codeword in the S codewords is a complex number vector that includes F complex numbers. A difference between the $i^{th}$ value and the $j^{th}$ value of the K bits is that a value of only one bit is different. A codeword that is included in the codebook and in a mapping relationship with the $i^{th}$ value is a codeword $C_i$, and a codeword that is included in the codebook and in a mapping relationship with the $j^{th}$ value is a codeword $C_j$, where the codeword $C_i$ does not include a complex number $Z_{j1}$ and a complex number $Z_{j2}$ that are included in the codeword $C_j$. K, F, and S are integers greater than 1, i is not equal to j, and i and j are positive integers less than or equal to S.

The transmitter 604 is configured to send the codeword $C_K$ by using the F resource units.

Optionally, in some possible implementation manners of the present invention, a codeword $C_p$ does not include a complex number $Z_{q1}$ and a complex number $Z_{q2}$ that are included in a codeword $C_q$, where the codeword $C_p$ and the codeword $C_q$ are any two codewords in S1 codewords, and the S1 codewords are a part or all of the S codewords.

Optionally, in some possible implementation manners of the present invention, a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords.

Optionally, in some possible implementation manners of the present invention, the processor 602 is configured to: when a modulation order corresponding to the codebook is M, obtain $\log_2(M)$ bits from each layer of data stream in W layers of data streams to form the K bits, where W and M are integers greater than 1.

Optionally, in some possible implementation manners of the present invention, the codebook includes a part or all of codewords in the codebook 1 in the foregoing embodiment when K is equal to 6.

Optionally, in some possible implementation manners of the present invention, the codebook includes a part or all of codewords in the codebook 2 in the foregoing embodiment when K is equal to 12.

Optionally, in some possible implementation manners of the present invention, the data transmission apparatus 600 is deployed on a user terminal or a base station, or the data transmission apparatus 600 is a user terminal or a base station.

It may be understood that functions of each function module of the data transmission apparatus 600 in this embodiment may be specifically implemented according to the methods in the foregoing method embodiments. For a specific implementation process, reference may be made to related descriptions of the foregoing method embodiments, and details are not described herein.

It can be learned that in some technical solutions of this embodiment, the data transmission apparatus 600 maps to-be-transmitted K bits to F resource units, where each bit in the K bits is mapped to at least two resource units in the F resource units, and K and F are integers greater than 1; and maps the bits mapped to the F resource units to a modulation symbol for transmission. Because each to-be-transmitted bit is mapped to at least two resource units in the F resource units, that is, each bit is redundantly transmitted on at least two resource units when data is being transmitted, bit transmission reliability is improved to some extent.

Figure 7:
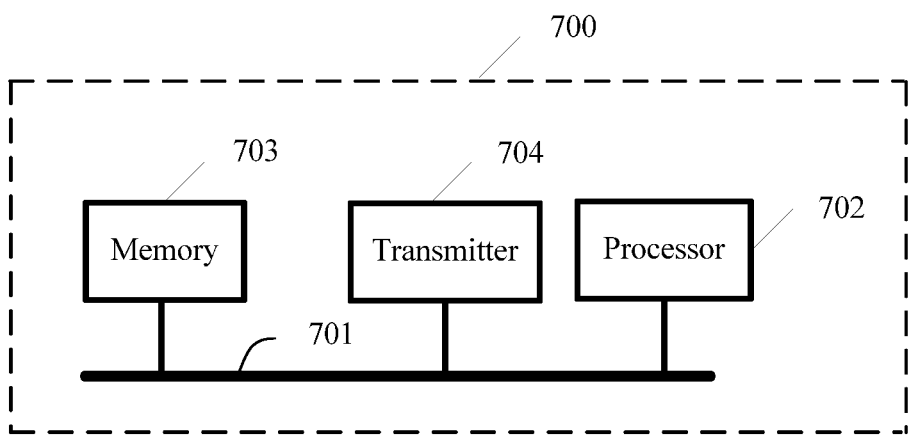
FIG. 7 is a schematic diagram of a data transmission apparatus according to an embodiment of the present invention.

Referring to FIG. 7, an embodiment of the present invention further provides a data transmission apparatus 700, including: a processor 702, a memory 703, and a transmitter 704 that are connected to each other by using a bus 701.

The processor 702 is configured to obtain to-be-transmitted K bits by invoking, by using the bus 701, code stored in the memory 703, and map the K bits to F resource units, where each bit in the K bits is mapped to at least two resource units in the F resource units, and K and F are integers greater than 1.

The transmitter 704 is configured to map the bits mapped to the F resource units to a modulation symbol for transmission.

Optionally, in some possible implementation manners of the present invention, the processor 702 is configured to divide the K bits into V bit sequences, and map the V bit sequences to the F resource units, where each bit sequence in the V bit sequences is mapped to at least two resource units in the F resource units, and V is an integer that is greater than 1 and less than or equal to K.

Optionally, in some possible implementation manners of the present invention, the V bit sequences are mapped to V resource unit groups, the V resource unit groups include different resource units, the V resource unit groups are in a one-to-one correspondence with the V bit sequences, and each resource unit group in the V resource unit groups includes at least two resource units in the F resource units.

Optionally, in some possible implementation manners of the present invention, a resource unit group i in the V resource unit groups includes a resource unit $i_1$ and a resource unit $i_2$, and a resource unit group j in the V resource unit groups includes a resource unit $j_1$ and the resource unit $i_2$.

Optionally, in some possible implementation manners of the present invention, the transmitter 604 is configured to map, based on a constellation diagram, the bits mapped to the F resource units to the modulation symbol for transmission.

A constellation diagram used for mapping y bits mapped to a resource unit j in the F resource units to the modulation symbol for transmission is a constellation diagram x. If y is an even number, the constellation diagram x is a square Gray constellation that includes $2^y$ constellation points, and/or if y is an odd number, the constellation diagram x is a cross Gray constellation that includes $2^y$ constellation points.

Optionally, in some possible implementation manners of the present invention, a bit a in the K bits is mapped to f1 resource units in the F resource units, and a bit b in the K bits is mapped to f2 resource units in the F resource units.

The bit a mapped to the f1 resource units is separately mapped to f1 bit carry positions on the modulation symbol, and the bit b mapped to the f2 resource units is separately mapped to f2 bit carry positions on the modulation symbol. A sum of transmission reliability indicator values corresponding to the f1 bit carry positions is $f1^+$, and a sum of transmission reliability indicator values corresponding to the f2 bit carry positions is $f2^+$, where an absolute value of a difference between $f1^+$ and $f2^+$ is less than or equal to a third threshold.

The bit a and the bit b are any two bits in the K bits. A larger transmission reliability indicator value indicates higher transmission reliability of a corresponding bit carry position, or a smaller transmission reliability indicator value indicates higher transmission reliability of a corresponding bit carry position.

Optionally, in some possible implementation manners of the present invention, a bit c in the K bits is mapped to f3 resource units in the F resource units, and a bit d in the K bits is mapped to f4 resource units in the F resource units.

The bit c mapped to the f3 resource units is separately mapped to f3 bit carry positions on the modulation symbol, and the bit d mapped to the f4 resource units is separately mapped to f4 bit carry positions on the modulation symbol. A sum of transmission reliability indicator values corresponding to the f3 bit carry positions is $f3^+$, and a sum of transmission reliability indicator values corresponding to the f4 bit carry positions is $f4^+$.

The bit c and the bit d are any two bits in the K bits.

If importance of the bit c is greater than importance of the bit d, and a larger transmission reliability indicator value indicates higher transmission reliability of a corresponding bit carry position, $f3^+$ is greater than $f4^+$; or if importance of the bit c is greater than importance of the bit d, and a smaller transmission reliability indicator value indicates higher transmission reliability of a corresponding bit carry position, $f3^+$ is less than $f4^+$.

Optionally, in some possible implementation manners of the present invention, the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

Optionally, in some possible implementation manners of the present invention, the data transmission apparatus 700 is deployed on a user terminal or a base station, or the data transmission apparatus 700 is a user terminal or a base station.

It may be understood that functions of each function module of the data transmission apparatus 700 in this embodiment may be specifically implemented according to the methods in the foregoing method embodiments. For a specific implementation process, reference may be made to related descriptions of the foregoing method embodiments, and details are not described herein.

It can be learned that in the solution of this embodiment, according to a codebook and a value of to-be-transmitted K bits, the data transmission apparatus 700 maps the K bits to F resource units to obtain a codeword $C_K$ that is to be transmitted by using the F resource units, where because the codebook includes S codewords in a one-to-one mapping relationship with S different values of the K bits, each codeword in the S codewords is a complex number vector that includes F complex numbers. When a difference between the $i^{th}$ value and the $j^{th}$ value of the K bits is that a value of only one bit is different, a codeword that is included in the codebook and in a mapping relationship with the $i^{th}$ value is a codeword $C_i$, a codeword that is included in the codebook and in a mapping relationship with the $j^{th}$ value is a codeword $C_j$, and the codeword $C_i$ does not include a complex number $Z_{j1}$ and a complex number $Z_{j2}$ that are included in the codeword $C_j$, if a value of a bit in the K bits is changed, at least two complex numbers in a corresponding codeword are changed accordingly. Complex numbers in a codeword are in a one-to-one mapping relationship with the resource units, that is, each bit in the K bits is mapped to at least two resource units in the F resource units. Because each to-be-transmitted bit is mapped to at least two resource units in the F resource units, that is, each bit is redundantly transmitted on at least two resource units when data is being transmitted, bit transmission reliability is improved to some extent.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

It should be noted that the user terminal in the embodiments of the present invention may also be referred to as a system, a subscriber unit, a subscriber station, a mobile station, a mobile, a remote station, a remote terminal, a mobile device, an access terminal, a terminal, a wireless communications device, a user agent, a user apparatus, or user equipment (UE). The user terminal may be a cellular phone, a cordless phone, a Session Initiation Protocol (SIP) phone, a wireless local loop (WLL) station, a handheld device having a wireless communication function, a personal digital assistant (PDA), an on-board equipment, a wearable device, a computing device, or another processing device connected to a wireless modem.

In addition, the base station in the embodiments of the present invention can be used to communicate with a mobile device; and the base station may be an access point (AP) of WiFi, a Base Transceiver Station (BTS) in Global System for Mobile communication (GSM) or Code Division Multiple Access (CDMA); or may be a NodeB (NB) in Wideband Code Division Multiple Access (WCDMA); or may further be an Evolved Node B (eNB or eNodeB) in Long Term Evolution (LTE), a relay station or an access point, a base station device in a future 5G network, or the like.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present invention. The foregoing storage medium includes: any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
   obtaining to-be-transmitted K bits;
   mapping the K bits to F resource units according to a codebook and a value of the K bits, so as to obtain a codeword $C_K$ that is to be transmitted using the F resource units, wherein the codebook comprises S codewords in a one-to-one mapping relationship with S different values of the K bits, S is less than or equal to $2^K$, each codeword in the S codewords is a complex number vector that comprises F complex numbers, a difference between the $i^{th}$ value and the $j^{th}$ value of the K bits is that a value of only one bit is different, a codeword that is comprised in the codebook and in a mapping relationship with the $i^{th}$ value is a codeword $C_i$, and a codeword that is comprised in the codebook and in a mapping relationship with the $j^{th}$ value is a codeword $C_j$, wherein the codeword $C_i$ does not comprise a complex number $Z_{j1}$ and a complex number $Z_{j2}$ that are comprised in the codeword $C_j$, K, F, and S are integers greater than 1, i is not equal to j, and i and j are positive integers less than or equal to S; and
   sending the codeword $C_K$ using the F resource units.

2. The method according to claim 1, wherein a codeword $C_p$ does not comprise a complex number $Z_{q1}$ and a complex number $Z_{q2}$ that are comprised in a codeword $C_q$, wherein the codeword $C_p$ and the codeword $C_q$ are any two codewords in S1 codewords, and the S1 codewords are a part or all of the S codewords.

3. The method according to claim 1, wherein a value of a complex number $Z_{u1}$, at a position α in a codeword $C_u$ is different from that of a complex number $Z_{e1}$, at a position α in a codeword $C_e$, a value of a complex number $Z_{u2}$ at a position β in the codeword $C_u$ is different from that of a complex number $Z_{e2}$ at a position β in the codeword $C_e$, the codeword $C_u$ and the codeword $C_e$ are any two codewords in S2 codewords, and the S2 codewords are a part or all of the S codewords.

4. The method according to claim 1, wherein obtaining the to-be-transmitted K bits comprises:
   when a modulation order corresponding to the codebook is M, obtaining $\log_2(M)$ bits from each layer of data stream in W layers of data streams to form the K bits, wherein W and M are integers greater than 1.

5. A method, comprising:
   obtaining to-be-transmitted K bits;
   mapping the K bits to F resource units, wherein each bit in the K bits is mapped to a plurality of resource units in the F resource units, and K and F are integers greater than 1 and wherein mapping the K bits to F resource units comprises:
      dividing the K bits into V bit sequences; and
      mapping the V bit sequences to the F resource units, wherein each bit sequence in the V bit sequences is mapped to a plurality of resource units in the F resource units, and V is an integer that is greater than 1 and less than or equal to K; and
   mapping the bits mapped to the F resource units to a modulation symbol for transmission.

6. The method according to claim 5, wherein the V bit sequences are mapped to V resource unit groups, the V resource unit groups comprise different resource units, the V resource unit groups are in a one-to-one correspondence with the V bit sequences, and each resource unit group in the V resource unit groups comprises a plurality of resource units in the F resource units.

7. The method according to claim 6, wherein a resource unit group i in the V resource unit groups comprises a resource unit $i_1$ and a resource unit $i_2$, and a resource unit group j in the V resource unit groups comprises a resource unit $j_1$ and the resource unit $i_2$.

8. The method according to claim 5, wherein mapping the bits mapped to the F resource units to the modulation symbol for transmission comprises:

mapping, based on a constellation diagram, the bits mapped to the F resource units to the modulation symbol for transmission;

wherein a constellation diagram used for mapping y bits mapped to a resource unit j in the F resource units to the modulation symbol for transmission is a constellation diagram x;

wherein, when y is an even number, the constellation diagram x is a square Gray constellation that comprises $2^y$ constellation points; and wherein when y is an odd number, the constellation diagram x is a cross Gray constellation that comprises $2^y$ constellation points.

9. The method according to claim 5, wherein a bit a in the K bits is mapped to f1 resource units in the F resource units, and a bit b in the K bits is mapped to f2 resource units in the F resource units;

wherein the bit a mapped to the f1 resource units is separately mapped to f1 bit carry positions on the modulation symbol, and the bit b mapped to the f2 resource units is separately mapped to f2 bit carry positions on the modulation symbol;

wherein a sum of transmission reliability indicator values corresponding to the f1 bit carry positions is $f1^+$, and a sum of transmission reliability indicator values corresponding to the f2 bit carry positions is $f2^+$, wherein an absolute value of a difference between $f1^+$ and $f2^+$ is less than or equal to a third threshold;

wherein the bit a and the bit b are any two bits in the K bits; and wherein a larger transmission reliability indicator value indicates higher transmission reliability of a corresponding bit carry position, or a smaller transmission reliability indicator value indicates higher transmission reliability of a corresponding bit carry position.

10. The method according to claim 5, wherein a bit c in the K bits is mapped to f3 resource units in the F resource units, and a bit d in the K bits is mapped to f4 resource units in the F resource units;

wherein the bit c mapped to the f3 resource units is separately mapped to f3 bit carry positions on the modulation symbol, and the bit d mapped to the f4 resource units is separately mapped to f4 bit carry positions on the modulation symbol;

wherein a sum of transmission reliability indicator values corresponding to the f3 bit carry positions is $f3^+$, and a sum of transmission reliability indicator values corresponding to the f4 bit carry positions is $f4^+$;

wherein the bit c and the bit d are any two bits in the K bits; and when importance of the bit c is greater than importance of the bit d, and a larger transmission reliability indicator value indicates higher transmission reliability of a corresponding bit carry position, $f3^+$ is greater than $f4^+$; or when importance of the bit c is greater than importance of the bit d, and a smaller transmission reliability indicator value indicates higher transmission reliability of a corresponding bit carry position, $f3^+$ is less than $f4^+$.

11. The method according to claim 10, wherein the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or wherein the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

12. An apparatus, comprising:

a processor;

a non-transitory memory; and a transmitter, wherein the processor, the memory and the transmitter are connected to each other by using a bus;

wherein the processor is configured to obtain to-be-transmitted K bits, and map the K bits to F resource units according to a codebook and a value of the K bits, so as to obtain a codeword $C_K$ that is to be transmitted by using the F resource units;

wherein the codebook comprises S codewords in a one-to-one mapping relationship with S different values of the K bits, S is less than or equal to $2^K$, each codeword in the S codewords is a complex number vector that comprises F complex numbers, a difference between the $i^{th}$ value and the $j^{th}$ value of the K bits is that a value of only one bit is different, a codeword that is comprised in the codebook and in a mapping relationship with the $i^{th}$ value is a codeword $C_i$, and a codeword that is comprised in the codebook and in a mapping relationship with the $j^{th}$ value is a codeword $C_j$, wherein the codeword $C_i$, does not comprise a complex number $Z_{j1}$ and a complex number $Z_{j2}$ that are comprised in the codeword $C_j$, K, F, and S are integers greater than 1, i is not equal to j, and i and j are positive integers less than or equal to S; and wherein the transmitter is configured to send the codeword $C_K$ using the F resource units.

13. The apparatus according to claim 12, wherein a codeword $C_p$ does not comprise a complex number $Z_{q1}$ and a complex number $Z_{q2}$ that are comprised in a codeword $C_q$, wherein the codeword $C_p$ and the codeword $C_q$ are any two codewords in S1 codewords, and the S1 codewords are a part or all of the S codewords.

14. The apparatus according to claim 12, wherein a value of a complex number $Z_{u1}$ at a position α in a codeword $C_u$ is different from that of a complex number $Z_{e1}$ at a position α in a codeword $C_e$, a value of a complex number $Z_{u2}$ at a position β in the codeword $C_u$ is different from that of a complex number $Z_{e2}$ at a position β in the codeword $C_e$ the codeword $C_u$ and the codeword $C_e$ are any two codewords in S2 codewords, and the S2 codewords are a part or all of the S codewords.

15. The apparatus according to claim 12, wherein the processor is further configured to: when a modulation order corresponding to the codebook is M, obtain $\log_2$ (M) bits from each layer of data stream in W layers of data streams to form the K bits, wherein W and M are integers greater than 1.

16. The apparatus according to claim 12, wherein, when K is equal to 6, the codebook comprises a part or all of codewords in the following codebook:

| Bit value | Codeword |
|---|---|
| 000000 | 1.2247 + 0.4082i 1.2247 + 0.4082i 1.2247 + 0.4082i 1.2247 + 0.4082i |
| 000001 | −1.2247 + 0.4082i 1.2247 + 0.4082i 1.2247 − 0.4082i 1.2247 + 0.4082i |
| 000010 | 1.2247 + 0.4082i 0.4082 + 0.4082i 1.2247 + 0.4082i −1.2247 + 0.4082i |
| 000011 | −1.2247 + 0.4082i 0.4082 + 0.4082i 1.2247 − 0.4082i −1.2247 + 0.4082i |
| 000100 | 1.2247 + 0.4082i −1.2247 + 0.4082i 0.4082 + 0.4082i 1.2247 + 0.4082i |
| 000101 | −1.2247 + 0.4082i −1.2247 + 0.4082i 0.4082 − 0.4082i 1.2247 + 0.4082i |
| 000110 | 1.2247 + 0.4082i −0.4082 + 0.4082i 0.4082 + 0.4082i −1.2247 + 0.4082i |
| 000111 | −1.2247 + 0.4082i −0.4082 + 0.4082i 0.4082 − 0.4082i −1.2247 + 0.4082i |
| 001000 | 1.2247 − 0.4082i 1.2247 + 0.4082i 1.2247 + 0.4082i 1.2247 − 0.4082i |
| 001001 | −1.2247 − 0.4082i 1.2247 + 0.4082i 1.2247 − 0.4082i 1.2247 − 0.4082i |
| 001010 | 1.2247 − 0.4082i 0.4082 + 0.4082i 1.2247 + 0.4082i −1.2247 − 0.4082i |
| 001011 | −1.2247 − 0.4082i 0.4082 + 0.4082i 1.2247 − 0.4082i −1.2247 − 0.4082i |
| 001100 | 1.2247 − 0.4082i −1.2247 + 0.4082i 0.4082 + 0.4082i 1.2247 − 0.4082i |
| 001101 | −1.2247 − 0.4082i −1.2247 + 0.4082i 0.4082 − 0.4082i 1.2247 − 0.4082i |
| 001110 | 1.2247 − 0.4082i −0.4082 + 0.4082i 0.4082 + 0.4082i −1.2247 − 0.4082i |
| 001111 | −1.2247 − 0.4082i −0.4082 + 0.4082i 0.4082 − 0.4082i −1.2247−0.4082i |
| 010000 | 1.2247 + 0.4082i 1.2247 + 0.4082i −1.2247 + 0.4082i 0.4082 + 0.4082i |
| 010001 | −1.2247 + 0.4082i 1.2247 + 0.4082i −1.2247 − 0.4082i 0.4082 + 0.4082i |
| 010010 | 1.2247 + 0.4082i 0.4082 + 0.4082i −1.2247 + 0.4082i −0.4082 + 0.4082i |
| 010011 | −1.2247 + 0.4082i 0.4082 + 0.4082i −1.2247 − 0.4082i −0.4082 + 0.4082i |
| 010100 | 1.2247 + 0.4082i −1.2247 + 0.4082i −0.4082 + 0.4082i 0.4082 + 0.4082i |
| 010101 | −1.2247 + 0.4082i −1.2247 + 0.4082i −0.4082 − 0.4082i 0.4082 + 0.4082i |
| 010110 | 1.2247 + 0.4082i −0.4082 + 0.4082i −0.4082 + 0.4082i −0.4082 + 0.4082i |
| 010111 | −1.2247 + 0.4082i −0.4082 + 0.4082i −0.4082 − 0.4082i −0.4082 + 0.4082i |
| 011000 | 1.2247 − 0.4082i 1.2247 + 0.4082i −1.2247 + 0.4082i 0.4082 − 0.4082i |
| 011001 | −1.2247 − 0.4082i 1.2247 + 0.4082i −1.2247 − 0.4082i 0.4082 − 0.4082i |
| 011010 | 1.2247 − 0.4082i 0.4082 + 0.4082i −1.2247 + 0.4082i −0.4082 − 0.4082i |
| 011011 | −1.2247 − 0.4082i 0.4082 + 0.4082i −1.2247 − 0.4082i −0.4082 − 0.4082i |
| 011100 | 1.2247 − 0.4082i −1.2247 + 0.4082i −0.4082 + 0.4082i 0.4082 − 0.4082i |
| 011101 | −1.2247 − 0.4082i −1.2247 + 0.4082i −0.4082 − 0.4082i 0.4082 − 0.4082i |
| 011110 | 1.2247 − 0.4082i −0.4082 + 0.4082i −0.4082 + 0.4082i −0.4082 − 0.4082i |
| 011111 | −1.2247 − 0.4082i −0.4082 + 0.4082i −0.4082 − 0.4082i −0.4082 − 0.4082i |
| 100000 | 0.4082 + 0.4082i 1.2247 − 0.4082i 1.2247 + 0.4082i 1.2247 + 0.4082i |
| 100001 | −0.4082 + 0.4082i 1.2247 − 0.4082i 1.2247 − 0.4082i 1.2247 + 0.4082i |
| 100010 | 0.4082 + 0.4082i 0.4082 − 0.4082i 1.2247 + 0.4082i −1.2247 + 0.4082i |
| 100011 | −0.4082 + 0.4082i 0.4082 − 0.4082i 1.2247 − 0.4082i −1.2247 + 0.4082i |
| 100100 | 0.4082 + 0.4082i −1.2247 − 0.4082i 0.4082 + 0.4082i 1.2247 + 0.4082i |
| 100101 | −0.4082 + 0.4082i −1.2247 − 0.4082i 0.4082 − 0.4082i 1.2247 + 0.4082i |
| 100110 | 0.4082 + 0.4082i −0.4082 − 0.4082i 0.4082 + 0.4082i −1.2247 + 0.4082i |
| 100111 | −0.4082 + 0.4082i −0.4082 − 0.4082i 0.4082 − 0.4082i −1.2247 + 0.4082i |
| 101000 | 0.4082 − 0.4082i 1.2247 − 0.4082i 1.2247 + 0.4082i 1.2247 − 0.4082i |
| 101001 | −0.4082 − 0.4082i 1.2247 − 0.4082i 1.2247 − 0.4082i 1.2247 − 0.4082i |
| 101010 | 0.4082 − 0.4082i 0.4082 − 0.4082i 1.2247 + 0.4082i −1.2247 − 0.4082i |
| 101011 | −0.4082 − 0.4082i 0.4082 − 0.4082i 1.2247 − 0.4082i −1.2247 − 0.4082i |
| 101100 | 0.4082 − 0.4082i −1.2247 − 0.4082i 0.4082 + 0.4082i 1.2247 − 0.4082i |
| 101101 | −0.4082 − 0.4082i −1.2247 − 0.4082i 0.4082 − 0.4082i 1.2247 − 0.4082i |
| 101110 | 0.4082 − 0.4082i −0.4082 − 0.4082i 0.4082 + 0.4082i −1.2247 − 0.4082i |
| 101111 | −0.4082 − 0.4082i −0.4082 − 0.4082i 0.4082 − 0.4082i −1.2247 − 0.4082i |
| 110000 | 0.4082 + 0.4082i 1.2247 − 0.4082i −1.2247 + 0.4082i 0.4082 + 0.4082i |
| 110001 | −0.4082 + 0.4082i 1.2247 − 0.4082i −1.2247 − 0.4082i 0.4082 + 0.4082i |
| 110010 | 0.4082 + 0.4082i 0.4082 − 0.4082i −1.2247 + 0.4082i −0.4082 + 0.4082i |
| 110011 | −0.4082 + 0.4082i 0.4082 − 0.4082i −1.2247 − 0.4082i −0.4082 + 0.4082i |
| 110100 | 0.4082 + 0.4082i −1.2247 − 0.4082i −0.4082 + 0.4082i 0.4082 + 0.4082i |
| 110101 | −0.4082 + 0.4082i −1.2247 − 0.4082i −0.4082 − 0.4082i 0.4082 + 0.4082i |
| 110110 | 0.4082 + 0.4082i −0.4082 − 0.4082i −0.4082 + 0.4082i −0.4082 + 0.4082i |
| 110111 | −0.4082 + 0.4082i −0.4082 − 0.4082i −0.4082 − 0.4082i −0.4082 + 0.4082i |
| 111000 | 0.4082 − 0.4082i 1.2247 − 0.4082i −1.2247 + 0.4082i 0.4082 − 0.4082i |
| 111001 | −0.4082 − 0.4082i 1.2247 − 0.4082i −1.2247 − 0.4082i 0.4082 − 0.4082i |
| 111010 | 0.4082 − 0.4082i 0.4082 − 0.4082i −1.2247 + 0.4082i −0.4082 − 0.4082i |
| 111011 | −0.4082 − 0.4082i 0.4082 − 0.4082i −1.2247 − 0.4082i −0.4082 − 0.4082i |
| 111100 | 0.4082 − 0.4082i −1.2247 − 0.4082i −0.4082 + 0.4082i 0.4082 − 0.4082i |
| 111101 | −0.4082 − 0.4082i −1.2247 − 0.4082i −0.4082 − 0.4082i 0.4082 − 0.4082i |
| 111110 | 0.4082 − 0.4082i −0.4082 − 0.4082i −0.4082 + 0.4082i −0.4082 − 0.4082i |
| 111111 | −0.4082 − 0.4082i −0.4082 − 0.4082i −0.4082 − 0.4082i −0.4082 − 0.4082i |

17. The apparatus according to claim 12, wherein the apparatus is deployed on a user terminal or a base station, or the apparatus is a user terminal or a base station.

18. An apparatus, comprising:
 a processor;
 a memory; and
 a transmitter;
 wherein the processor, the memory, and the transmitter are connected to each other by a bus;
 wherein the processor is configured to:
  obtain to-be-transmitted K bits;
  map the K bits to F resource units, wherein each bit in the K bits is mapped to a plurality of resource units in the F resource units, and K and F are integers greater than 1, and wherein mapping the K bits to the F resource units comprises:
   dividing the K bits into V bit sequences; and
   mapping the V bit sequences to the F resource units, wherein each bit sequence in the V bit sequences is mapped to a plurality of resource units in the F resource units, and V is an integer that is greater than 1 and less than or equal to K; and wherein the transmitter is configured to map the bits mapped to the F resource units to a modulation symbol for transmission.

19. The apparatus according to claim 18, wherein the V bit sequences are mapped to V resource unit groups, the V resource unit groups comprise different resource units, the V resource unit groups are in a one-to-one correspondence with the V bit sequences, and each resource unit group in the V resource unit groups comprises a plurality of resource units in the F resource units.

20. The apparatus according to claim 19, wherein a resource unit group i in the V resource unit groups comprises a resource unit $i_1$ and a resource unit $i_2$, and a resource unit group j in the V resource unit groups comprises a resource unit $j_i$ and the resource unit $i_2$.

21. The apparatus according to claim 18, wherein the transmitter is further configured to map, based on a constellation diagram, the bits mapped to the F resource units to the modulation symbol for transmission;
wherein a constellation diagram used for mapping y bits mapped to a resource unit j in the F resource units to the modulation symbol for transmission is a constellation diagram x; and
wherein when y is an even number, the constellation diagram x is a square Gray constellation that comprises $2^y$ constellation points; and
wherein when y is an odd number, the constellation diagram x is a cross Gray constellation that comprises $2^y$ constellation points.

22. The apparatus according to claim 18, wherein a bit a in the K bits is mapped to f1 resource units in the F resource units, and a bit b in the K bits is mapped to f2 resource units in the F resource units;
wherein the bit a mapped to the f1 resource units is separately mapped to f1 bit carry positions on the modulation symbol, and the bit b mapped to the f2 resource units is separately mapped to f2 bit carry positions on the modulation symbol;
wherein a sum of transmission reliability indicator values corresponding to the f1 bit carry positions is $f1^+$, and a sum of transmission reliability indicator values corresponding to the f2 bit carry positions is $f2^+$, wherein an absolute value of a difference between $f1^+$ and $f2^+$ is less than or equal to a third threshold;
wherein the bit a and the bit b are any two bits in the K bits; and
wherein a larger transmission reliability indicator value indicates higher transmission reliability of a corresponding bit carry position, or a smaller transmission reliability indicator value indicates higher transmission reliability of a corresponding bit carry position.

23. The apparatus according to claim 18, wherein a bit c in the K bits is mapped to f3 resource units in the F resource units, and a bit d in the K bits is mapped to f4 resource units in the F resource units;
wherein the bit c mapped to the f3 resource units is separately mapped to f3 bit carry positions on the modulation symbol, and the bit d mapped to the f4 resource units is separately mapped to f4 bit carry positions on the modulation symbol;
wherein a sum of transmission reliability indicator values corresponding to the f3 bit carry positions is $f3^+$, and a sum of transmission reliability indicator values corresponding to the f4 bit carry positions is $f4^+$;
wherein the bit c and the bit d are any two bits in the K bits; and
when importance of the bit c is greater than importance of the bit d, and a larger transmission reliability indicator value indicates higher transmission reliability of a corresponding bit carry position, $f3^+$ is greater than $f4^+$; or when importance of the bit c is greater than importance of the bit d, and a smaller transmission reliability indicator value indicates higher transmission reliability of a corresponding bit carry position, $f3^+$ is less than $f4^+$.

24. The apparatus according to claim 23, wherein the to-be-transmitted K bits are obtained by performing, based on a turbo code, channel coding on $W_0$ original data streams corresponding to W users, the bit c is a system bit, the bit d is a check bit, and the importance of the bit c is greater than the importance of the bit d; or
wherein the to-be-transmitted K bits are obtained by performing, based on a low density parity check code, channel coding on W0 original data streams corresponding to W users, a degree of the bit c is greater than a degree of the bit d, and the importance of the bit c is greater than the importance of the bit d.

* * * * *

UNITED STATES PATENT AND TRADEMARK OFFICE
CERTIFICATE OF CORRECTION

PATENT NO. : 10,219,278 B2
APPLICATION NO. : 15/474200
DATED : February 26, 2019
INVENTOR(S) : Wang Page 1 of 1

It is certified that error appears in the above-identified patent and that said Letters Patent is hereby corrected as shown below:

In the Claims

In Column 35, Line 67, Claim 18, delete "bits:" and insert --bits;--.

In Column 37, Line 15, Claim 20, delete "$j_i$" and insert --$j_1$--.

Signed and Sealed this
Fourth Day of June, 2019

Andrei Iancu
*Director of the United States Patent and Trademark Office*